(12) United States Patent
Cho et al.

(10) Patent No.: US 11,402,943 B2
(45) Date of Patent: *Aug. 2, 2022

(54) INPUT SENSING UNIT AND DISPLAY DEVICE INCLUDING THE SAME

(71) Applicant: Samsung Display Co., Ltd., Yongin-Si (KR)

(72) Inventors: Hyun Wook Cho, Yongin-si (KR); Tae Joon Kim, Yongin-si (KR); Eun Sol Seo, Yongin-si (KR); Eung Kwan Lee, Yongin-si (KR); Jae Woo Choi, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/373,683

(22) Filed: Jul. 12, 2021

(65) Prior Publication Data

US 2021/0342053 A1 Nov. 4, 2021

Related U.S. Application Data

(63) Continuation of application No. 16/583,172, filed on Sep. 25, 2019, now Pat. No. 11,061,504.

(30) Foreign Application Priority Data

Nov. 21, 2018 (KR) ........................ 10-2018-0144835

(51) Int. Cl.
*G06F 3/00* (2006.01)
*G06F 3/041* (2006.01)

(52) U.S. Cl.
CPC ........ *G06F 3/04164* (2019.05); *G06F 3/0412* (2013.01); *G06F 3/04162* (2019.05); *G06F 2203/04107* (2013.01)

(58) Field of Classification Search
None
See application file for complete search history.

(56) References Cited

U.S. PATENT DOCUMENTS 9,886,127 B2 2/2018 Choi
2015/0227254 A1 8/2015 Kim et al.
(Continued)

FOREIGN PATENT DOCUMENTS

KR 10-2014-0077000 A 6/2014
KR 10-1524928 B1 6/2015
(Continued)

*Primary Examiner* — Michael A Faragalla
(74) *Attorney, Agent, or Firm* — Innovation Counsel LLP

(57) ABSTRACT

An input sensing unit may include the following elements: a first sensing electrode including first sensors and a first connector coupling the first sensors; a second sensing electrode including second sensors and a second connector coupling the second sensors; a first sensing line including first sensing line parts and a third connector coupling the first sensing line parts; a second sensing line; and an insulating layer including a first insulating side and a second insulating side opposite the first insulating side. The first sensing line parts may overlap the first sensors and may be disposed on the first insulating side. The second sensing line may overlap the second sensors and may be disposed on the first insulating side. The first sensors may be disposed on the second insulating side. The second sensors may be disposed on the second insulating side.

20 Claims, 27 Drawing Sheets

(56) References Cited

U.S. PATENT DOCUMENTS

| | | | |
|---|---|---|---|
| 2016/0139701 A1* | 5/2016 | Wang | G06F 3/0446 |
| | | | 345/174 |
| 2017/0147132 A1* | 5/2017 | Choi | G06F 3/0446 |
| 2018/0158877 A1 | 6/2018 | Zeng et al. | |
| 2018/0246608 A1 | 8/2018 | Huh et al. | |

FOREIGN PATENT DOCUMENTS

| KR | 10-1653719 B1 | 9/2016 |
|---|---|---|
| KR | 10-2017-0060833 A | 6/2017 |
| KR | 10-2018-0046708 A | 5/2018 |

* cited by examiner

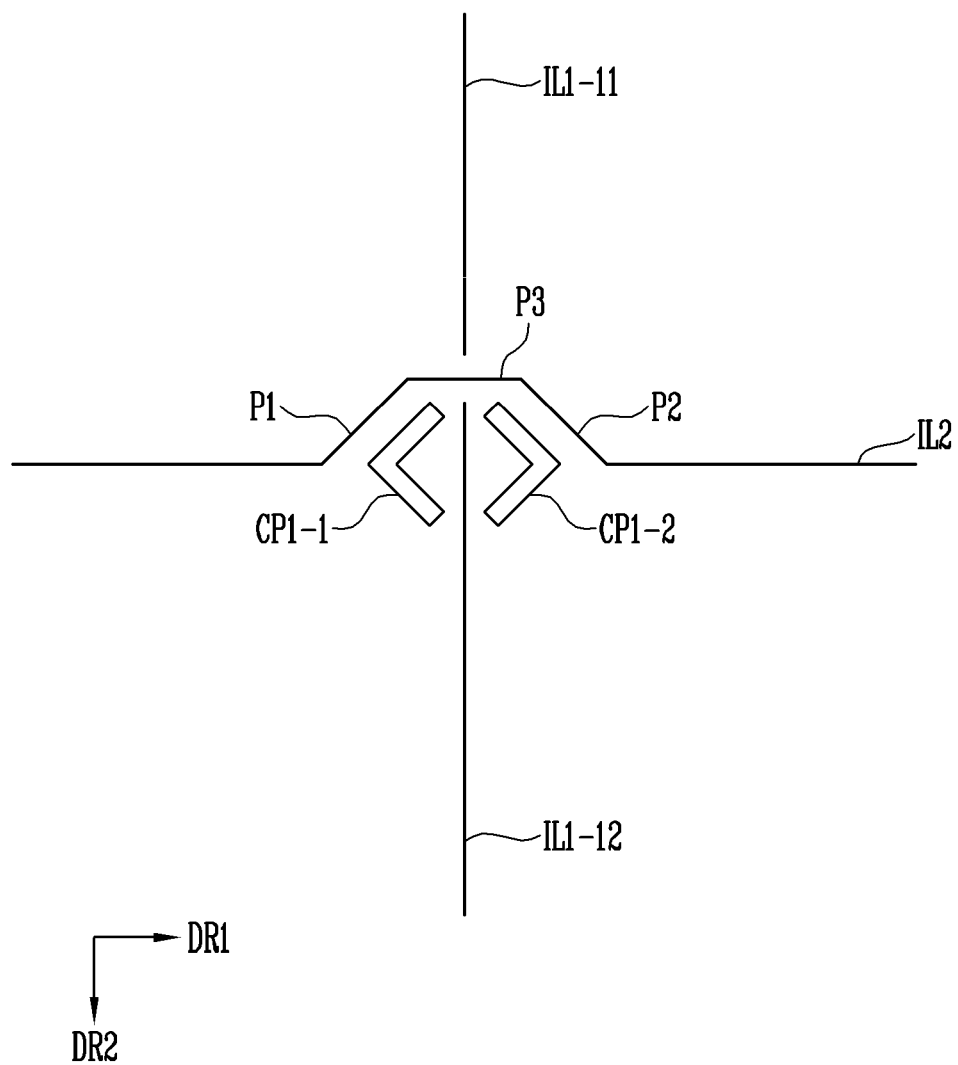

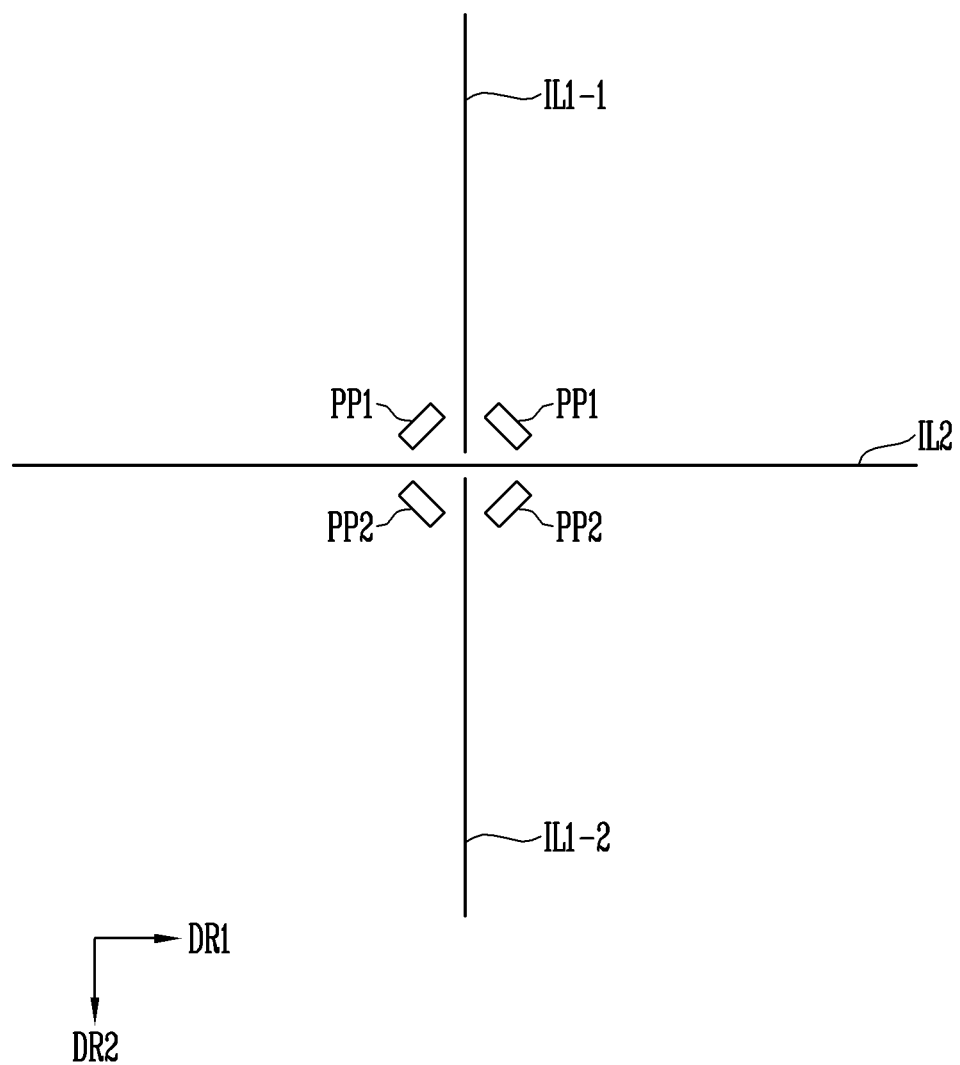

INPUT SENSING UNIT AND DISPLAY DEVICE INCLUDING THE SAME

CROSS-REFERENCE TO RELATED APPLICATION(S)

This application is a continuation application of U.S. patent application Ser. No. 16/583,172 filed on Sep. 25, 2019, which claims priority to Korean patent application number 10-2018-0144835 filed on Nov. 21, 2018; the entire disclosure of the Korean Patent Application is incorporated herein by reference.

BACKGROUND

Field

The technical field relates to an input sensing unit and a display device including the input sensing unit.

Description of Related Art

A touch panel including an input sensing unit may be mounted on a surface of a display panel for converting a physical touch by a user into an electrical signal to operate an electronic device or display device. For example, the electronic device or display device may be a flat panel display, a smartphone, or a tablet PC.

The touch panel may include multiple component layers for performing sensing functions. The multiple component layers may cause the thickness of the electronic device or display device to be undesirably large. One or more separate processes of attaching the component layers may cause complications and/or failures in manufacturing of electronic devices or display devices.

SUMMARY

Various embodiments are directed to a digitizer-integrated input sensing unit capable of performing both a touch function and a digitizer function.

Various embodiments are directed to a display device including the input sensing unit.

An embodiment may provide an input sensing unit including: a first sensing electrode including first sensors and first connectors configured to couple the first sensors; a second sensing electrode including second sensors and second connectors configured to couple the second sensors; first sensing lines including first sensing line parts and third connectors configured to couple the first sensing line parts; and second sensing lines. The first sensing line parts and the second sensing lines may be disposed in a first conductive layer, the first sensors and the second sensors may be disposed in a second conductive layer, and an insulating layer may be disposed between the first conductive layer and the second conductive layer.

In an embodiment, the first sensing electrode and the second sensing electrode may sense a first touch input, and the first sensing line and the second sensing line may sense a second touch input.

In an embodiment, the first touch input may be an input generated by a body of a user, and wherein the second touch input may be an input generated by a digitizer pen.

In an embodiment, the third connectors may be disposed on the second conductive layer and configured to electrically couple the first sensing line parts through at least one connection contact hole.

In an embodiment, the third connectors may be formed in openings defined in either the first sensors or the second sensors.

In an embodiment, the first sensing electrodes may be arranged in a first direction, and the second sensing electrodes may be arranged in a second direction perpendicular to the first direction.

In an embodiment, the second sensing lines may extend in a first direction, and may include: first patterns extending in an oblique direction with respect to the first direction; second patterns extending in a direction perpendicular to the first pattern; and third patterns parallel with the first direction and configured to couple the first patterns and the second patterns.

In an embodiment, the third patterns may intersect with the third connectors with the insulating layer interposed therebetween.

In an embodiment, either the first connectors or the second connectors may be disposed in the first conductive layer, and the other connectors may be disposed in the second conductive layer.

In an embodiment, each of the first sensing line parts may have a shape extending in a first direction, and each of the second sensing lines may have a shape extending in a second direction.

In an embodiment, the third connectors may be formed in openings defined in connectors disposed in the second conductive layer among the first connectors and the second connectors.

In an embodiment, the third connectors may intersect with the second sensing lines with the insulating layer interposed therebetween.

In an embodiment, either the first connectors or the second connectors may include: a first pattern and a second pattern formed in the first conductive layer; and a third pattern formed in the second conductive layer and electrically coupled to the first pattern and the second pattern through at least one or more connection contact holes.

In an embodiment, the third pattern may be formed in openings defined in sensors coupled by the other connectors of the first connectors and the second connectors.

In an embodiment, the input sensing unit may further include: third electrode lines formed in first openings defined in the first sensors; and fourth electrode lines formed in second openings defined in the second sensors.

In an embodiment, the third electrode lines may be coupled with either the first electrode lines or the second electrodes lines through at least one connection contact hole. The fourth electrode lines may be coupled with the other electrode lines of the first electrode lines and the second electrode lines through at least one connection contact hole.

In an embodiment, the third electrode lines and the fourth electrode lines may be formed through a process identical with a process of forming the first sensors and the second sensors.

In an embodiment, the first sensors may include first dummy electrodes formed in third openings, and the second sensors may include second dummy electrodes formed in fourth openings.

In an embodiment, each of the first sensing electrodes and the second sensing electrodes may have a mesh structure formed of metal lines.

In an embodiment, the first sensing lines may extend in a first direction, and the second sensing lines may extend in a second direction perpendicular to the first direction, wherein the first sensing lines and the second sensing lines may extend along shapes of the metal lines.

In an embodiment, the input sensing unit may further include: third electrode lines formed in first openings defined in the first sensors; and fourth electrode lines formed in second openings defined in the second sensors.

In an embodiment, each of the third electrode lines and the fourth electrode lines may be formed of at least two metal lines directly coupled to each other at at least one intersection point.

In an embodiment, each of the third electrode lines and the fourth electrode lines may be formed of at least two metal lines indirectly coupled to each other by at least one connection metal line.

An embodiment may provide a display device including: a display panel configured to display an image; and an input sensing unit disposed on the display panel. The input sensing unit may include: a first sensing electrode including first sensors and first connectors configured to couple the first sensors; a second sensing electrode including second sensors and second connectors configured to couple the second sensors; first sensing lines including first sensing line parts and third connectors configured to couple the first sensing line parts; and second sensing lines. The first sensing line parts and the second sensing lines may be disposed in the first conductive layer, the first sensors and the second sensors may be disposed in the second conductive layer, and an insulating layer may be disposed between the first conductive layer and the second conductive layer.

In an embodiment, the display panel may include: a base layer; a circuit element layer disposed on the base layer, and including a circuit element configured to display the image; a display element layer disposed on the circuit element layer, and including a light emitting element configured to display the image; and a thin-film encapsulation layer disposed on the display element layer and configured to protect the display element layer.

In an embodiment, the first conductive layer may be disposed on the thin-film encapsulation layer.

In an embodiment, the input sensing unit may further include: first signal lines coupled to the respective first sensing electrodes; and second signal lines coupled to respective first ends of the second sensing electrodes. The display panel may further include pad parts electrically coupled to the first signal lines and the second signal lines.

In an embodiment, the display device may further include fifth signal lines coupled to respective second ends of the second sensing electrodes.

In an embodiment, the first signal lines and the second signal lines may be coupled to the pad parts through at least one contact hole.

In an embodiment, the first sensing electrode and the second sensing electrode may be configured to sense an input generated by a body of a user, and the first sensing line and the second sensing line may be configured to sense an input generated by a digitizer pen.

An embodiment may be related to an input sensing unit. The input sensing unit may include the following elements: a first sensing electrode including first sensors and a first connector coupling the first sensors; a second sensing electrode including second sensors and a second connector coupling the second sensors; a first sensing line including first sensing line parts and a third connector coupling the first sensing line parts; a second sensing line; and an insulating layer including a first insulating side (e.g., the lower side of IS-IL1 shown in FIG. 6E) and a second insulating side (e.g., the upper side of IS-IL1 shown in FIG. 6E) opposite the first insulating side. The first sensing line parts may overlap the first sensors and may directly contact the first insulating side.

The second sensing line may overlap the second sensors and may directly contact the first insulating side. The first sensors may directly contact the second insulating side. The second sensors may directly contact the second insulating side.

The first sensors may be wider than the first sensing line in a direction perpendicular to a lengthwise direction of the first sensing line. The second sensors may be wider than the second sensing line in the lengthwise direction of the first sensing line. A thickness of the second sensing line may be equal to a thickness of the first sensing line parts.

A material of the first sensing line parts may be identical to a material of the second sensing lines. A material of the first sensors may be identical to a material of the second sensors. The first sensing electrode and the second sensing electrode may sense a first touch input. The first sensing line and the second sensing line may sense a second touch input.

The first touch input may be an input generated by a body of a user. The second touch input may be an input generated by a digitizer pen.

The third connector may directly contact the second insulating side and may electrically couple the first sensing line parts through at least one connection contact hole positioned in the insulating layer. A material of the third connector may be identical to the material of first sensors.

The third connector may be disposed in an opening positioned in either a first sensor of the first sensors or a second sensor of the second sensors.

The first sensing electrode may intersect the second sensing electrode.

The second sensing line may include the following elements: a first section extending obliquely with respect to the first sensing line parts in a plan view of the input sensing unit; a second section extending perpendicular to the first section in the plan view of the input sensing unit; and a third section extending perpendicular to the first sensing line parts in the plan view of the input sensing unit and coupling the first section to the second section.

The third section may intersect the third connector with a portion of the insulating layer being interposed between the third section and the third connector.

One of the first connector and the second connector may directly contact the first insulating side. The other of the first connector and the second connector may directly contact the second insulating side.

The third connecter or one of the first sensing line parts may intersect the second sensing line.

The third connector may be disposed in an opening positioned in one of the first connector and the second connector.

The third connector may intersect the second sensing lines with a portion of the insulating layer being interposed between the third connector and the second sensing line.

One of the first connector and the second connector may include the following elements: a first section and a second section directly contacting the first insulating side; and a third section directly contacting the second insulating side and electrically coupled to the first section and the second section through one or more connection contact holes.

The third section may be disposed in an opening positioned in one of the first sensors or one of the second sensors that is directly coupled to the other of the first connector and the second connector.

The input sensing unit may include the following elements: a third sensing line disposed in a first opening positioned in a first sensor among the first sensors; and a fourth sensing line disposed in a second opening positioned in a second sensor among the second sensors.

The third sensing line may be electrically coupled with one of the first sensing line and the second sensing line through at least one first connection contact hole. The fourth sensing line may be electrically coupled with the other of the first sensing line and the second sensing line through at least one second connection contact hole.

A material of the third sensing line and the fourth sensing line may be identical to a material of the first sensors and the second sensors.

The input sensing unit may include the following elements: first dummy electrodes disposed in third openings positioned in the first sensors; and second dummy electrodes disposed in fourth openings positioned in the second sensors.

Each of the first sensing electrode and the second sensing electrode may have a mesh structure comprising metal lines.

Sections of the first sensing lines may extend in a first direction. Sections the second sensing lines extend in a second direction perpendicular to the first direction.

The sections of the first sensing lines and the sections of the second sensing lines extend parallel to the metal lines and extend obliquely relative to an edge of the input sensing unit.

The input sensing unit may include the following elements: a third sensing line disposed in a first opening positioned in a first sensor among the first sensors; and a fourth sensing line disposed in a second opening positioned in a second sensor among the second sensors.

Each of the third sensing line and the fourth sensing line may include at least two metal lines directly coupled to each other at one or more intersection points.

Each of the third sensing line and the fourth sensing line may include a connection metal line and at least two metal lines indirectly coupled to each other through the connection metal line.

An embodiment may be related to a display device. The display device may include the following elements: a display panel configured to display an image; and an input sensing unit overlapping the display panel. The input sensing unit may include the following elements: a first sensing electrode including first sensors and a first connector coupling the first sensors; a second sensing electrode including second sensors and a second connector coupling the second sensors; a first sensing lines including first sensing line parts and a third connector coupling the first sensing line parts; a second sensing lines; and an insulating layer including a first insulating side and a second insulating side opposite the first insulating side. The first sensing line parts may overlap the first sensors and may directly contact the first insulating side. The second sensing line may overlap the second sensors and may directly contact the first insulating side. The first sensors may directly contact the second insulating side. The second sensors may directly contact the second insulating side.

The display panel may include the following elements: a base layer; a display element layer overlapping the base layer and configured to display the image; and a thin-film encapsulation layer overlapping the display element layer and configured to protect the display element layer.

The first sensing line parts may be disposed directly on the thin-film encapsulation layer.

The input sensing unit may include the following elements: a first signal line electrically coupled to the first sensing electrode; and a second signal line electrically coupled to a first end of the second sensing electrode. The display panel may include pad parts electrically coupled to the first signal line and the second signal line.

The display device may include a third signal line coupled to a second end of the second sensing electrode.

The first signal line and the second signal line may be coupled to the pad parts through at least one contact hole.

Each of the first sensors may be wider than each of the first sensing line parts in a direction perpendicular to a lengthwise direction of the first sensing line. The first sensing electrode and the second sensing electrode may be configured to sense an input generated by a body of a user. The first sensing line and the second sensing line may be configured to sense an input generated by a digitizer pen.

BRIEF DESCRIPTION OF THE DRAWINGS

FIG. 6B is a plan view illustrating an intersection area of a first conductive layer of the input sensing unit in accordance with the first embodiment.

FIG. 9B is a plan view illustrating an intersection area of a first conductive layer of the input sensing unit in accordance with the fourth embodiment.

DETAILED DESCRIPTION

Figure 1:
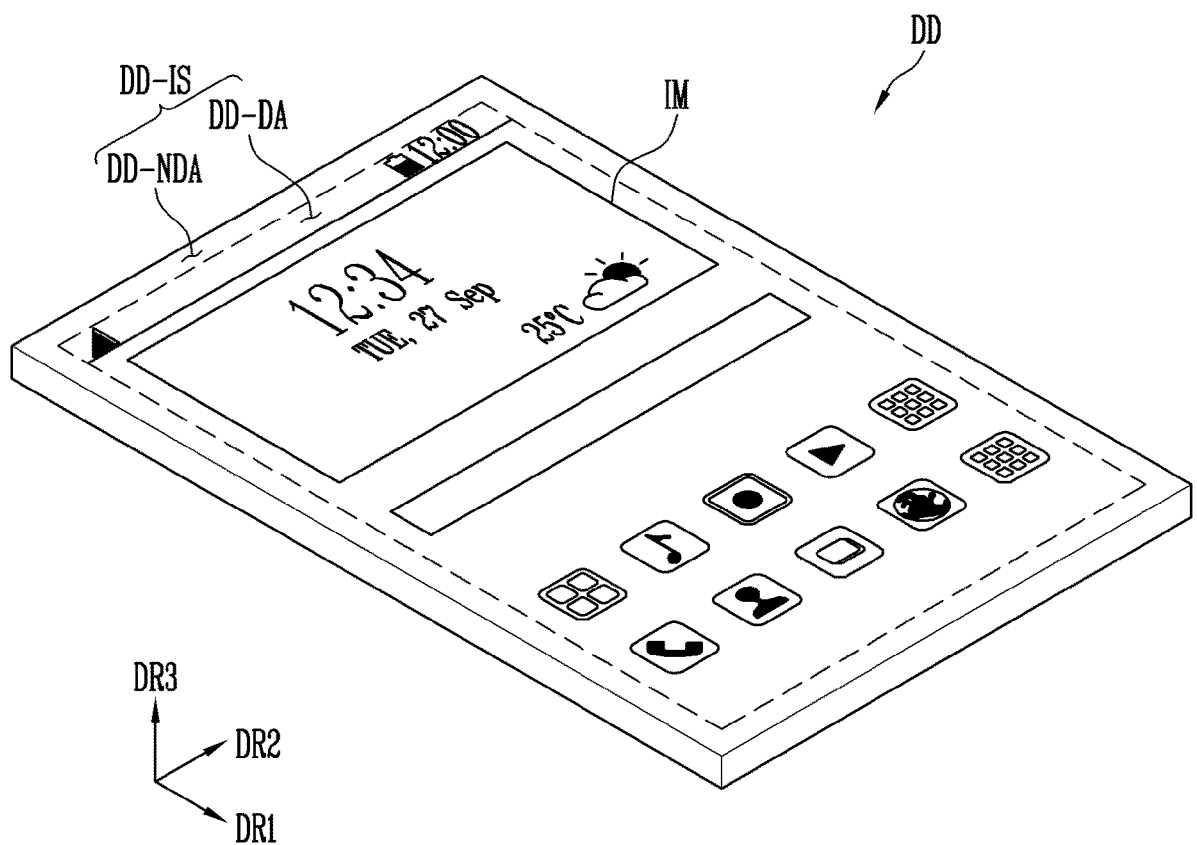
FIG. 1 is a perspective view illustrating a display device in accordance with an embodiment.

Example embodiments are illustrated in the drawings and described in detail in the written description. The described embodiments do not intended to limit practical embodiments to particular modes of practice. All changes, equivalents, and substitutes do not depart from the spirit and technical scope of practical embodiments.

In the disclosure, like reference numerals may refer to like parts. Sizes of elements in the accompanying drawings may be exaggerated for clarity of illustration. Although the terms "first," "second", etc. may be used herein to describe various elements, these elements should not be limited by these terms. These terms are used to distinguish one element from another element. For instance, a first element could be termed a second element without departing from the teachings of embodiments. The second element could also be termed the first element. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set), " "second-type (or second-set)," etc., respectively.

Singular forms may include plural forms as well, unless the context clearly indicates otherwise.

The terms "comprise", "include", "have", etc. may specify the presence of stated features, integers, steps, operations, elements, components, and/or combinations of them but do not preclude the presence or addition of one or more other features, integers, steps, operations, elements, components, and/or combinations.

When a first part is disposed on a second part, the first part may be disposed directly on the second part or indirectly disposed on the second part with a third part disposed between the first part and the second part.

The term "display device" may mean "electronic device capable of displaying different images." The term "couple" (elements) may mean "be positioned between and directly connected to" and/or "electrically connect" (two elements or two of the elements). The term "pattern" may mean "section" or "member." The term "connect" may mean "electrically connect." The term "insulate" may mean "electrically insulate." The term "coupled" may mean "electrically coupled" and/or "mechanically coupled." The term "disposed/included in a conductive layer" may mean "formed of" the same conductive material(s) through the same process step(s) (and directly contacting a same face/side of an insulating layer). The term "disposed on the same layer" may mean "directly contact the same face/side of the same layer." The term "conductive" may mean "electrically conductive." The term "defined in" may mean "positioned in." The term "around" may mean "near." The term "shape" may mean "structure."

FIG. 1 is a perspective view illustrating a display device DD in accordance with an embodiment. As shown in FIG. 1, the display device DD may display an image IM through a display surface DD-IS. The display surface DD-IS is parallel to a plane defined by a first directional axis DR1 and a second directional axis DR2. A normal direction of the display surface DD-IS, i.e., a thickness direction of the display device DD, is indicated by a third directional axis DR3. The axes DR1, DR2, and DR3 also represent corresponding directions DR1, DR2, and DR3.

A front surface (or an upper surface) and a rear surface (or a lower surface) of each of elements or units of the display device DD are defined based on the third directional axis DR3. The directional axes DR1, DR2, and DR3 shown in the embodiments are only for examples, and directions indicated by the directional axes DR1, DR2, and DR3 are relative concepts and may be changed to other directions.

The display device DD may include a planar display surface. The display device DD may include a curved display surface or a three-dimensional display surface. The three-dimensional display surface may include a plurality of display areas oriented in different directions and may include, for example a polyprism-shaped display surface.

The display device DD may be a rigid display device. The display device DD may be a flexible display device DD. In embodiments, the display device DD may be (included in) a cellular phone terminal. Although not shown, one or more of electronic modules, a camera module, a power supply module, and so forth, which are mounted on a main board, may be disposed, along with the display device DD, on/in a bracket/casing or the like to form the cellular phone terminal. The display device DD may be (included in) a large electronic device (such as a television or a monitor) or a small or medium device (such as a tablet PC, a vehicle navigation system, a game console, or a smartwatch).

As shown in FIG. 1, the display surface DD-IS includes a display area DD-DA on which an image IM is displayed according to input signals, and a non-display area DD-NDA formed around the display area DD-DA. The non-display area DD-NDA is an area on which no images are dynamically displayed.

As shown in FIG. 1, the display area DD-DA may be rectangular. The non-display area DD-NDA may enclose the display area DD-DA. The display area DD-DA and/or the non-display area DD-NDA may have other shapes.

FIGS. 2A to 2F are cross-sectional views of the display device DD in accordance with one or more embodiments. FIGS. 2A to 2F show cross-sections parallel to the plane defined by the second directional axis DR2 and the third directional axis DR3. FIGS. 2A to 2F are schematic views to explain a stacking relationship of functional panels and/or functional units that constitute the display device DD.

The display device DD may include a display panel, an input sensing unit (an input sensing panel, a touch sensing unit, a touch panel, or a touch sensor), an anti-reflection unit, and a window unit. At least some components of the display panel, the input sensing unit, the reflection prevention unit, and the window unit may be formed through a continuous process, or at least some components may be coupled to each other by at least an adhesive member. In FIGS. 2A to 2F, an optically clear adhesive member OCA is illustrated as an example of the adhesive member. The adhesive member may include a typical adhesive or temporary adhesive. In an embodiment, the anti-reflection unit and/or the window unit may be replaced with other components or may be unnecessary.

In FIGS. 2A to 2F, in the input sensing unit, the reflection prevention unit, and the window unit, components formed through one or more same process steps (and formed of one or more same materials) may be expressed as being disposed/included in a same "layer". In the input sensing unit, the reflection prevention unit, and the window unit, components coupled to each other by at least an adhesive member may constitute a "panel". Although a "panel" may include a base layer, e.g., a synthetic resin film, a composite material film, or a glass substrate, for providing a base surface, a "layer" may not include a base layer. Units included in a "layer" may be disposed on one or more base surfaces provided by other units.

The input sensing unit, the reflection prevention unit, and the window unit may be referred to as an input sensing panel ISP, a reflection prevention panel RPP, and a window panel WP, or as an input sensing layer ISL, a reflection prevention layer RPL, and a window layer WL, depending on whether a base layer is present/included or not.

Figure 2A:
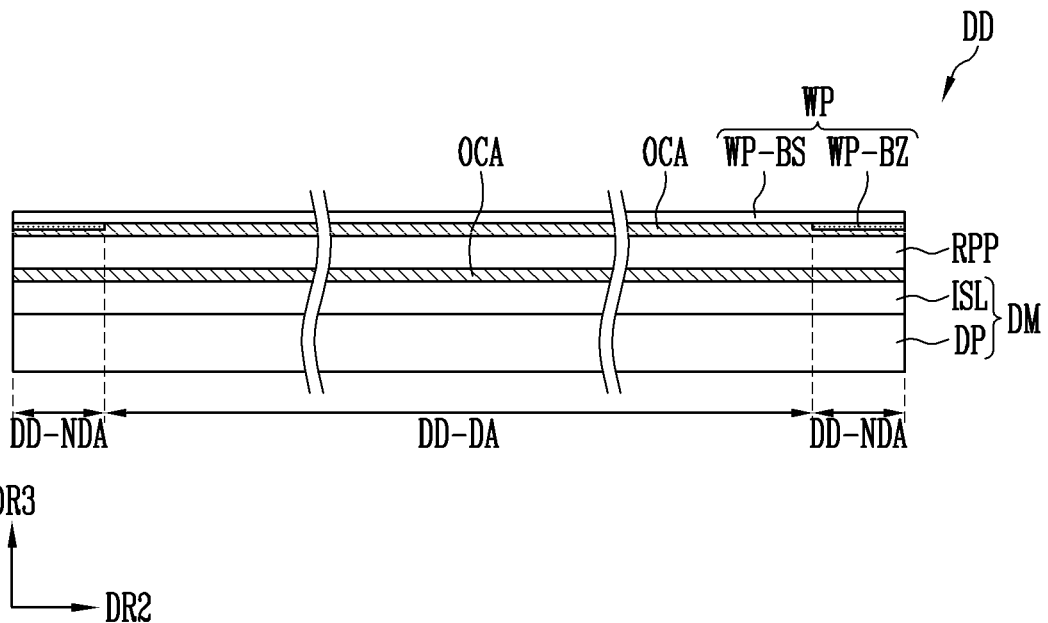
FIG. 2A, FIG. 2B, FIG. 2C, FIG. 2D, FIG. 2E, and FIG. 2F are cross-sectional views illustrating the display device in accordance with one or more embodiments.

As shown in FIG. 2A, the display device DD may include a display panel DP, an input sensing layer ISL, a reflection prevention panel, and a window panel WP. The input sensing layer ISL may be directly disposed on the display panel DP. In this specification, the words "component B is directly disposed on component A" mean that there is no separate adhesive layer/member between component A and component B. Component B may be formed on a base surface provided by component A through an immediately subsequent process after component A has been formed.

A combination of the displayer panel DP and the input sensing layer ISL that is directly disposed on the display panel DP may be defined as a display module DM. Optically clear adhesive members OCA may be respectively disposed between the display module DM and the reflection prevention panel RPP and between the reflection prevention panel RPP and the window panel WP.

The display panel DP may display an image. The input sensing layer ISL may obtain coordinate information of external input (e.g., a touch event). Although not shown, the display module DM may further include a protective member disposed on a lower surface of the display panel DP. The protective member and the display panel DP may be coupled to each other by an adhesive member. Each of the display devices DD of FIGS. 2B to 2F may also further include a protective member.

The display panel DP may be a light-emitting display panel. For example, the display panel DP may be an organic light-emitting display panel or a quantum dot light-emitting display panel. An emission layer of the organic light-emitting display panel may include organic light-emitting material. An emission layer of the quantum dot light-emitting display panel may include quantum dots and quantum rods. Hereinafter, the display panel DP will be explained as an organic light-emitting display panel.

The reflection prevention panel RPP may reduce reflectivity of external light that is incident from an upper surface of the window panel WP. The reflection prevention panel RPP may include a phase retarder and a polarizer. The phase retarder may be a film type retarder or a liquid crystal coated retarder and include a λ/2 phase retarder and/or a λ/4 phase retarder. The polarizer may also be a film type polarizer or a liquid crystal coated polarizer. The film type retarder or polarizer may include an elongation synthetic resin film, and the liquid crystal coated retarder or polarizer may include liquid crystals formed in a predetermined arrangement. Each of the phase retarder and the polarizer may further include a protective film. The phase retarder and the polarizer themselves or the protective film may be defined as the base layer of the reflection prevention panel RPP.

The reflection prevention panel RPP may include color filters. The color filters have a predetermined arrangement. The arrangement of the color filters may be determined taking into account emission colors of pixels included in the display panel DP. The reflection prevention panel RPP may further include a black matrix adjacent to the color filters.

The reflection prevention panel RPP may include a destructive interference structure. For example, the destructive interference structure may include a first reflective layer and a second reflective layer which are disposed on respective different layers. First reflective light and second reflective light which are respectively reflected by the first reflective layer and the second reflective layer destructively interfere with each other, such that the reflectivity of external light is reduced.

The window panel WP includes a base film WP-BS and a light shielding pattern WP-BZ. The base film WP-BS may include a glass substrate and/or a synthetic resin film. The base film WP-BS is not limited to a single layer structure. The base film WP-BS may include two or more films coupled to each other by an adhesive member.

The light shielding pattern WP-BZ may partially overlap the base film WP-BS. The light shielding pattern WP-BZ may be disposed on a rear surface of the base film WP-BS and define a bezel area, i.e., a non-display area DD-NDA (refer to FIG. 1), of the display device DD.

The light shielding pattern WP-BZ may be a colored organic layer and may be formed by, e.g., a coating method. Although not shown, the window panel WP may further include a functional coating layer disposed on a front surface of the base film WP-BS. The functional coating layer may include a fingerprint prevention layer, a reflection prevention layer, a hard coating layer, etc. In FIGS. 2 to 2F, the window panel WP or the window layer WL are simplified without being divided into the base film WP-BS and the light shielding pattern WP-BZ.

Figure 2B:
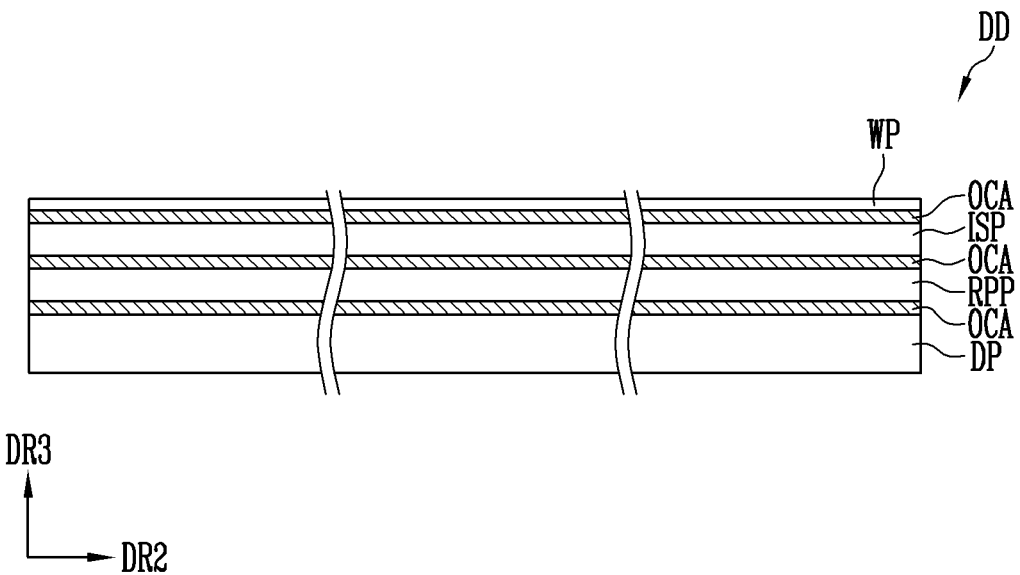
Figure 2C:
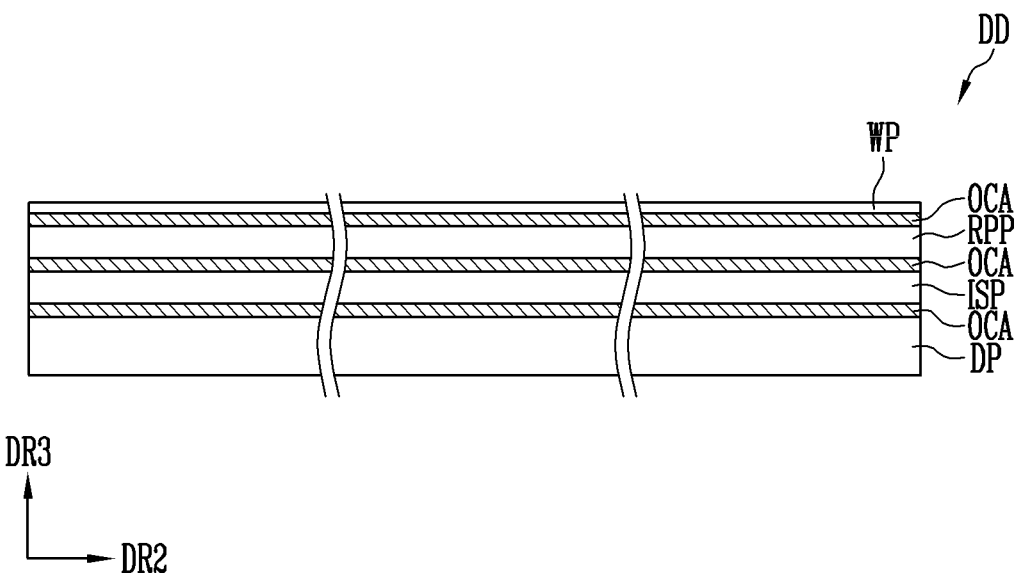

As shown in FIGS. 2B and 2C, the display device DD may include a display panel DP, an input sensing panel ISP, a reflection prevention panel RPP, and a window panel WP. A stacking sequence of the input sensing panel ISP and the reflection prevention panel RPP may be configured according to embodiments.

Figure 2D:
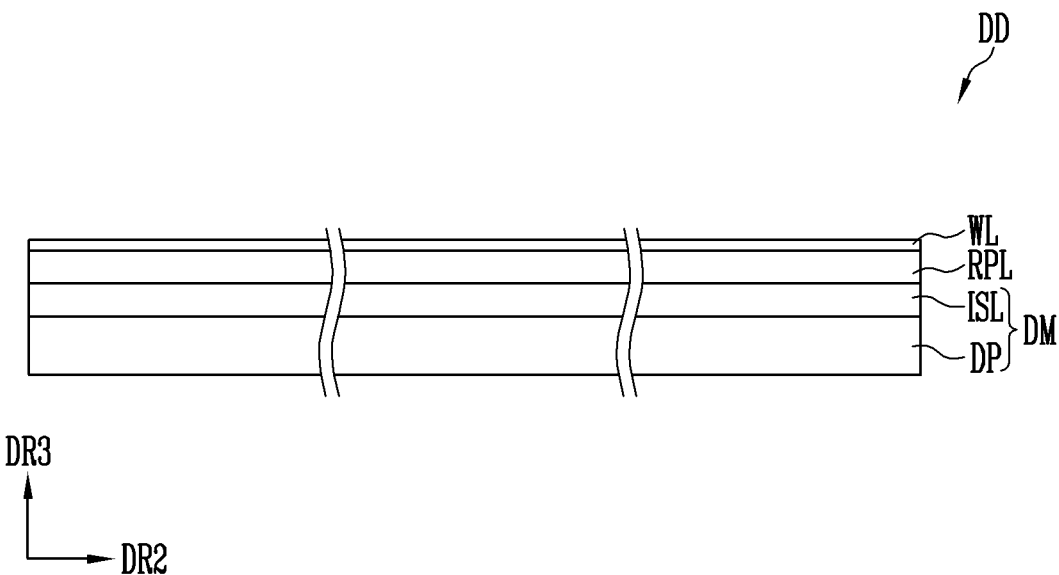

As shown in FIG. 2D, the display device DD may include a display panel DP, an input sensing layer ISL, a reflection prevention layer RPL, and a window layer WL. Adhesive members may be omitted from the display device DD, and the input sensing layer ISL, the reflection prevention layer RPL, and the window layer WL may be formed on a base surface provided on the display panel DP through a continuous process. A stacking sequence of the input sensing layer ISL and the reflection prevention layer RPL may be configured according to embodiments.

Figure 2E:
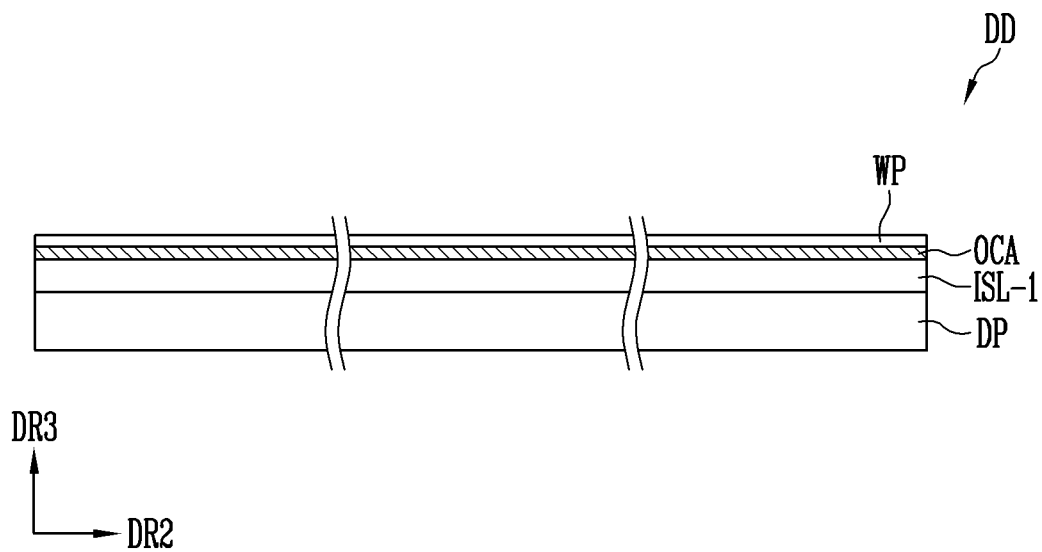
Figure 2F:
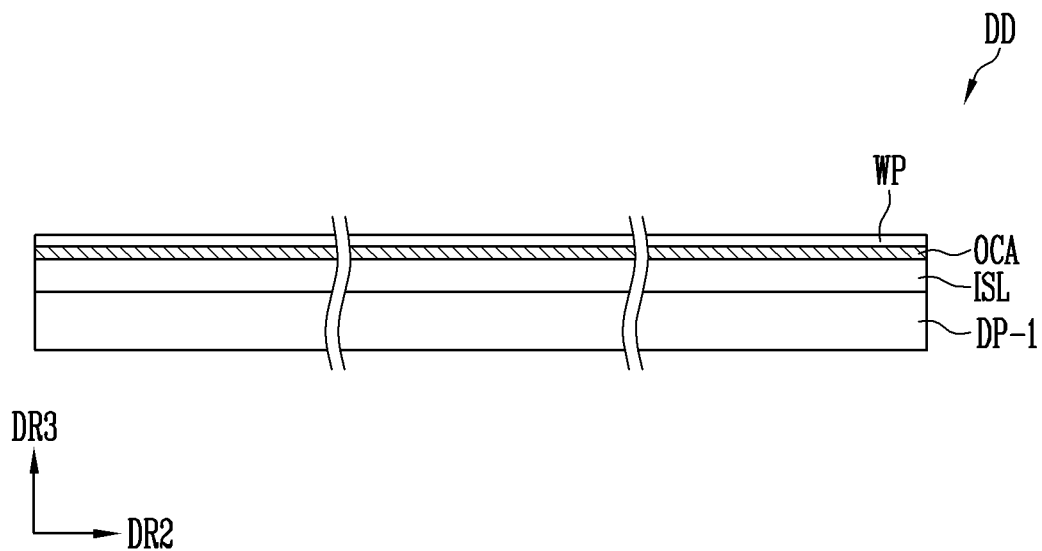

As shown in FIGS. 2E and 2F, the display device DD may not include a separate reflection prevention unit.

As shown in FIG. 2E, the display device DD may include a display panel DP, an input sensing layer ISL-1, and a window panel WP. Unlike the input sensing panel ISP or the input sensing layer ISL shown in FIGS. 2A to 2D, the input sensing layer ISL-1 may further have a reflection prevention function.

As shown in FIG. 2F, the display device DD may include a display panel DP-1, an input sensing layer ISL, and a window panel WP. Unlike the display panels DP shown in FIGS. 2A to 2E, the display panel DP-1 may further have a reflection prevention function.

The input sensing panel ISP may have a reflection prevention function for the same reason as that of the input sensing layer ISL-1.

In FIGS. 2A to 2F, the input sensing unit is illustrated as overlapping the entirety of the display panel. As shown in FIG. 2A, the input sensing unit may overlap the entirety of the display area DD-DA.

In an embodiment, the input sensing unit may overlap only a portion of the display area DD-DA, or overlap only the non-display area DD-NDA. The input sensing unit may be a touch sensing panel configured to sense a touch of a user, or a fingerprint sensing panel configured to sense fingerprint information of the finger of the user. The input sensing unit may be a digitizer sensing panel configured to sense a digitizer pen. The pitches and widths of sensing electrodes may be configured depending on the use purpose of the input sensing unit. Sensing electrodes of the touch sensing panel may have a width in a range from several millimeters (mm) to several tens of millimeters (mm) Sensing electrodes of the fingerprint sensing panel may have a width in a range from several tens of micrometers (μm) to several hundreds of micrometers (μm).

Figure 3:
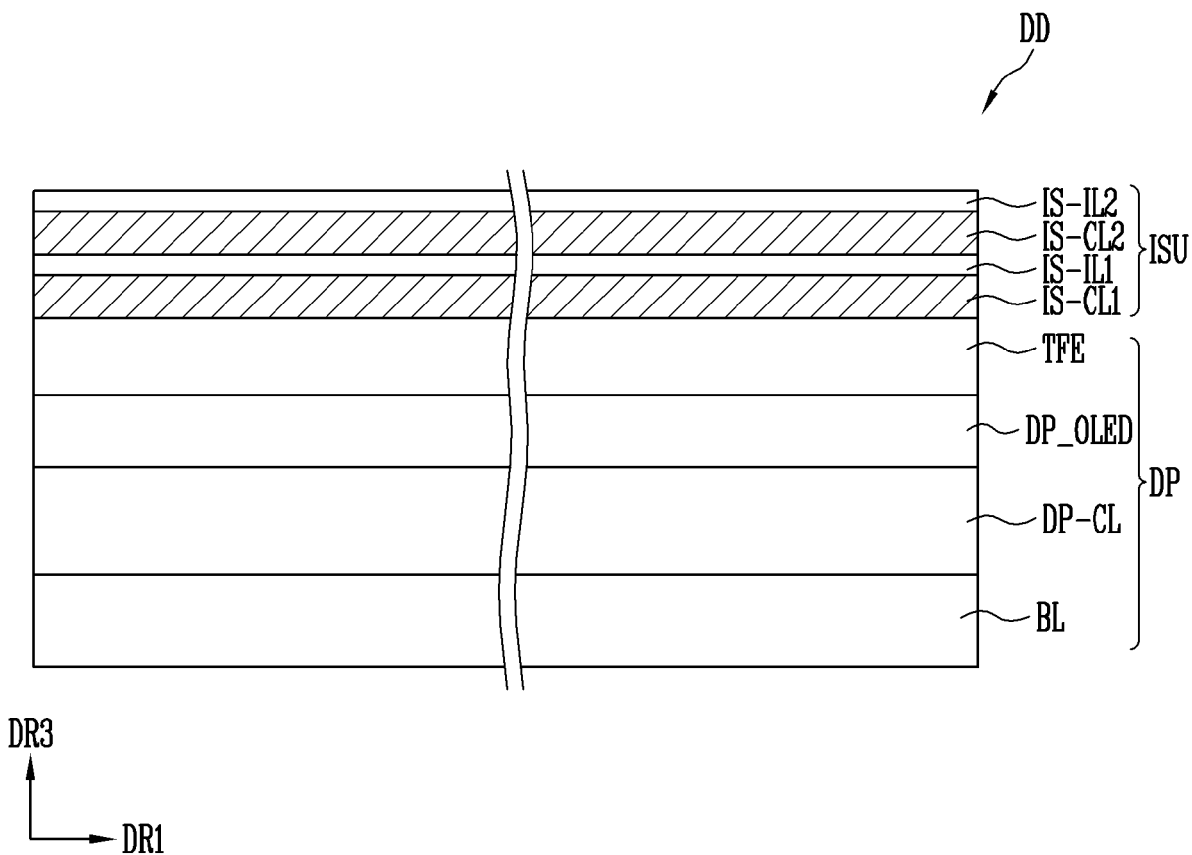
FIG. 3 is a cross-sectional view illustrating the display device in accordance with an embodiment.

FIG. 3 is a cross-sectional view illustrating the display device DD in accordance with an embodiment.

The display device DD in accordance with an embodiment may include a display panel DP and an input sensing unit ISU. The display panel DP and the input sensing unit ISU may be formed through a continuous process, or may be coupled to each other by an adhesive member. An optically clear adhesive member OCA may be used as the adhesive member.

As shown in FIG. 3, the display panel DP may include a base layer BL, a circuit element layer DP-CL disposed on the base layer BL, a display element layer DP-OLED, and a thin-film encapsulation layer TFE. The display panel DP may further include functional layers such as a reflection prevention layer and a refractivity adjustment layer.

The base layer BL may include a synthetic resin film. A synthetic resin layer is formed on a work panel which is used when the display panel DP is manufactured. Thereafter, a conductive layer, an insulating layer, and so forth are formed on the synthetic resin layer. When the work panel is removed, the synthetic resin layer corresponds to the base layer BL. The synthetic resin layer may be a polyimide-based resin layer. The base layer BL may include a glass substrate, a metal substrate, an organic/inorganic composite material substrate, or the like.

The circuit element layer DP-CL may include at least one insulating layer and a circuit element. The insulating layer included in the circuit element layer DP-CL will be referred to as an intermediate insulating layer. The intermediate insulating layer includes at least one intermediate inorganic layer and at least one intermediate organic layer. The circuit element includes a signal line, a pixel driving circuit, etc. The circuit element layer DP-CL may be formed by a process of forming an insulating layer, a semiconductor layer, and a conductive layer through a coating operation, a deposition operation, etc., and a process of patterning the insulating layer, the semiconductor layer, and the conductive layer through a photolithography operation.

The display element layer DP-OLED may include a light-emitting element. The display element layer DP-OLED may include organic light-emitting diodes. The display element layer DP-OLED may further include an organic layer such as a pixel define layer.

The thin-film encapsulation layer TFE may seal the display element layer DPL. The thin-film encapsulation layer TFE includes at least one insulating layer. The thin-film encapsulation layer TFE may include at least one inorganic layer (referred to as an encapsulation inorganic layer). The thin-film encapsulation layer TFE may include at least one organic layer (referred to as an encapsulation organic layer) and at least one an encapsulation inorganic layer.

The encapsulation inorganic layer may protect the display element layer DP-OLED from water/oxygen. The encapsulation organic layer may protect the display element layer DP-OLED from foreign material such as dust particles. The encapsulation inorganic layer may include a silicon nitride layer, silicon oxynitride layer, a silicon oxide layer, a titanium oxide layer, or an aluminum oxide layer. The encapsulation organic layer may include an acrylic organic layer.

FIG. 3 illustrates that the input sensing unit ISU has a layered structure. The input sensing unit ISU having a layered structure may be directly disposed on the base surface provided by the display panel DP, so that a separate base layer may be unnecessary. Therefore, the thickness of the display module DM may be minimized. In an embodiment, the base surface may be an upper surface of the thin-film encapsulation layer TFE.

In an embodiment, the input sensing unit ISU may have a panel structure. The panel structure may include a base layer, e.g., a synthetic resin film, a composite material film, or a glass substrate, for providing a base surface.

The input sensing unit ISU may have a multi-layer structure, regardless of whether it has a panel structure or a layered structure. The input sensing unit ISU may include a sensing electrode, a signal line coupled to the sensing electrode, and at least one insulating layer. For instance, the input sensing unit ISU may sense an external input by a capacitive sensing method. The operating method of the input sensing unit ISU may not be limited to a particular method. In an embodiment, the input sensing unit ISU may sense an external input by an electromagnetic induction method or a pressure sensing method. In various embodiments, the input sensing unit ISU may sense not only a touch of the user but also a touch of a digitizer pen.

As illustrated in FIG. 3, the input sensing unit ISU may include a first conductive layer IS-CL1, a first insulating layer IS-IL1, a second conductive layer IS-CL2, and a second insulating layer IS-IL2. Each of the first and second conductive layers IS-CL1 and IS-CL2 may have a single-layer structure, or a multi-layer structure in which multiple layers are stacked along the third direction DR3.

The conductive layer having a single-layer structure may include a metal layer or a transparent conductive layer. The metal layer may include at least one of molybdenum, silver, titanium, copper, aluminum, and an alloy of some of them. The transparent conductive layer may include transparent conductive oxide such as indium tin oxide (ITO), indium zinc oxide (IZO), zinc oxide (ZnO), or indium tin zinc oxide (ITZO). The transparent conductive layer may include a conducting polymer such as PEDOT, a metal nanowire, graphene, etc.

The conductive layer having a multilayer structure may include multiple metal layers. For example, the multiple metal layers may form a three-layer structure having a titanium-aluminum-titanium layered structure. The conductive layer having a multilayer structure may include at least one metal layer and at least one transparent conductive layer.

Each of the first and second conductive layers IS-CL1 and IS-CL2 may include a plurality of patterns. The first conductive layer IS-CL1 may include first conductive patterns, and the second conductive layer IS-CL2 may include second conductive patterns. Each of the first and second conductive patterns may include sensing electrodes, sensing lines, and signal lines.

The stack structure and the material(s) of the sensing electrodes may be determined taking a sensing sensitivity into account. An RC delay may affect the sensing sensitivity. Since the resistance of the sensing electrodes each including a metal layer is less than that of the transparent conductive layer, the RC value of the sensing electrodes is reduced. Therefore, the charging time of a capacitor defined between the sensing electrodes may be reduced. Sensing electrodes each of which includes a transparent conductive layer may be invisible to the user, unlike sensing electrodes each including a metal layer, and have a comparatively high capacitance because they have an increased input surface area.

The sensing electrodes each of which includes a metal layer may have a mesh structure to prevent them from being visible to the user. The thickness of the thin-film encapsulation layer TFE may be adjusted to prevent the input sensing unit ISU from being affected by noise generated by components of the display element layer DP-OLED.

Each of the first and second insulating layers IS-IL1 and IS-IL2 may have a single- or multi-layer structure. Each of the first and second insulating layers IS-IL1 and IS-IL2 may include inorganic material, organic material, or composite material.

At least one of the first and second insulating layers IS-IL1 and IS-IL2 may include an inorganic layer. The inorganic layer may include at least one of aluminum oxide, titanium oxide, silicon oxide, silicon oxynitride, zirconium oxide, and hafnium oxide.

At least one of the first and second insulating layers IS-IL1 and IS-IL2 may include an organic layer. The organic layer may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, and perylene-based resin.

Figure 4:
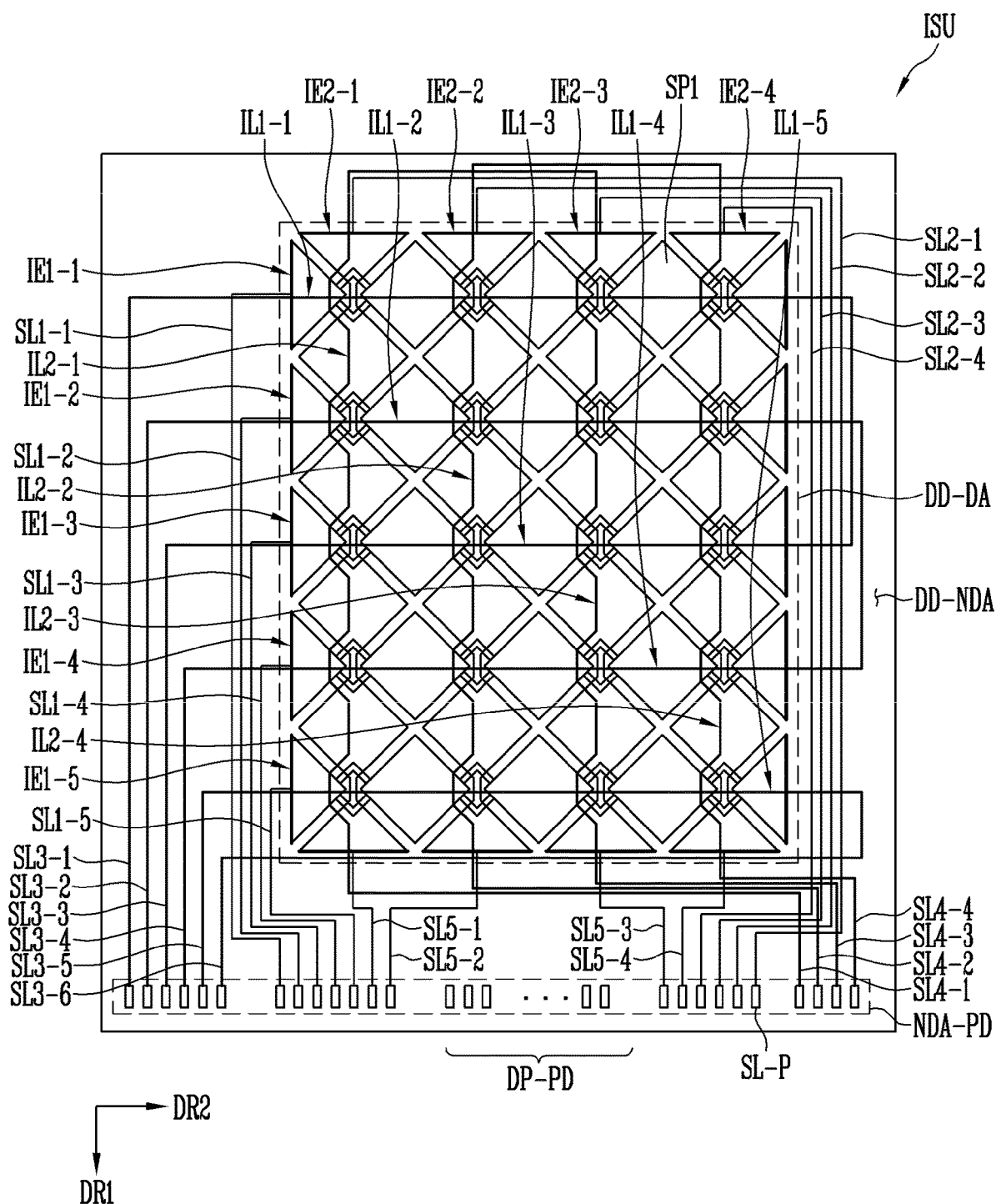
FIG. 4 is a plan view illustrating an input sensing unit in accordance with an embodiment.

FIG. 4 is a plan view illustrating the input sensing unit ISU in accordance with an embodiment.

As illustrated in FIG. 4, the input sensing unit ISU may include first sensing electrodes IE1-1 to IE1-5, first signal lines SL1-1 to SL1-5 coupled to the first sensing electrodes IE1-1 to IE1-5, second sensing electrodes IE2-1 to IE2-4, and second signal lines SL2-1 to SL2-4 and fifth signal lines SL5-1 to SL5-4 which are coupled to the second sensing electrodes IE2-1 to IE2-4. Although not shown, the input sensing unit ISU may further include an optical dummy electrode disposed in a boundary area between first sensing electrodes IE1-1 to IE1-5 and second sensing electrodes IE2-1 to IE2-4.

The first sensing electrodes IE1-1 to IE1-5 may intersect with the second sensing electrodes IE2-1 to IE2-4. The first sensing electrodes IE1-1 to IE1-5 may be arranged in the first direction DR1, and each may extend in the second direction DR2. The second sensing electrodes IE2-1 to IE2-4 may be arranged in the second direction DR2, and each may extend in the first direction DR1.

The first sensing electrodes IE1-1 to IE1-5 and the second sensing electrodes IE2-1 to IE2-4 may sense an external input in a mutual capacitance manner and/or a self-capacitance manner. Alternatively or additionally, the first sensing electrodes IE1-1 to IE1-5 and the second sensing electrodes IE2-1 to IE2-4 may calculate coordinates of an external input in a mutual capacitance manner during a first period, and thereafter recalculate the coordinates of the external input in a self-capacitance manner during a second period. In an embodiment, the first sensing electrodes IE1-1 to IE1-5 and the second sensing electrodes IE2-1 to IE2-4 may sense a touch input (a first touch input) generated by, e.g., a finger of the user.

Referring to FIGS. 6A to 6E, each of the first sensing electrodes IE1-1 to IE1-5 may include first sensors SP1 and first connectors CP1. Each of the second sensing electrodes IE2-1 to IE2-4 may include second sensors SP2 and second connectors CP2. Among the first sensors SP1, each of two first sensors SP1 that are disposed on two opposite ends of a first sensing electrode may have a size smaller than that of a first sensor SP1 disposed in a central portion of the first sensing electrode, e.g., have a size corresponding to ½ of the first sensor SP1 disposed in the central portion. Among the second sensors SP2, each of two second sensors SP2 that are disposed on two opposite ends of a second sensing electrode may have a size smaller than that of a second sensor SP2 disposed in a central portion of the second sensing electrode, e.g., have a size corresponding to ½ of the second sensor SP2 disposed in the central portion.

In an embodiment, each of the first connectors CP1 may include a plurality of first connectors, e.g., two first connectors CP1-1 and CP1-2. The two first connectors CP1-1 and CP1-2 may be disposed at two opposite sides of a corresponding second connector CP2 and do not intersect with the second connectors CP2. The first connectors CP1-1 and CP1-2 may be disposed on a first layer, and the second connectors CP2 are disposed on a second layer different from the first layer.

The two first connectors CP1-1 and CP1-2 may reduce the resistance of the corresponding sensing electrode. Even if either one of the two first connectors CP1-1 and CP1-2 is disconnected (e.g., disconnected by static electricity), connection of the corresponding sensing electrodes may be maintained. Since the two first connectors CP1-1 and CP1-2 do not intersect with the second connectors CP2, a related parasitic capacitance may be minimized.

In an embodiment, each of the second connectors CP2 may include a plurality of second connectors CP2, and each of the first connectors CP1 may be a single first connector CP1.

Although each of the first and second sensors SP1 and SP2 has been illustrated in FIG. 4 as having a substantially rhombus shape, the first sensors SP1 and the second sensors SP2 may have one or more other polygonal shapes.

In each first sensing electrode, first sensors SP1 may be arranged in the second direction DR2. In each second sensing electrode, second sensors SP2 may be arranged in the first direction DR1. Each of the first connectors CP1 couples two immediately adjacent first sensors SP1 to each other. Each of the second connectors CP2 couples two immediately adjacent second sensors SP2 to each other.

The first signal lines SL1-1 to SL1-5 are coupled to first ends of the respective first sensing electrodes IE1-1 to IE1-5. The second signal lines SL2-1 to SL2-4 are coupled to first ends of the respective second sensing electrodes M2-1 to IE2-4. In an embodiment, the fifth signal lines SL5-1 to SL5-4 may be coupled to second ends of the second sensing electrodes IE2-1 to IE2-4. In an embodiment, signal lines may also be coupled to second ends of the first sensing electrodes IE1-1 to IE1-5.

Since the second signal lines SL2-1 to SL2-4 are coupled to the first ends of the second sensing electrodes IE2-1 to IE2-4, and since the fifth signal lines SL5-1 to SL5-4 are further coupled to the second ends of the second sensing electrodes IE2-1 to IE2-4, the sensing sensitivity may be enhanced compared to the case where only the second signal lines SL2-1 to SL2-4 are coupled to the second signal lines SL2-1 to SL2-4. Because the second sensing electrodes IE2-1 to IE2-4 are longer than the first sensing electrodes IE1-1 to IE1-5, a significant voltage drop of a detection signal (or a transmitting signal) may occur, such that the sensing sensitivity may be reduced if the fifth signal lines SL5-1 to SL5-4 are not implemented. Since the detection signal (or the transmitting signal) is provided through the second signal lines SL2-1 to SL2-4 and the fifth signal lines SL5-1 to SL5-4 that are coupled to opposite ends of the respective second sensing electrodes M2-1 to IE2-4, a significant voltage drop of the detection signal (or the transmitting signal) may be prevented, such that reduction in the sensing sensitivity may be prevented.

Each signal line of the first, second, and fifth signal lines SL1-1 to SL1-5, SL2-1 to SL2-4, and SL5-1 to SL5-4 may include a line part connected to a pad part SL-P. The pad parts SL-P may be arranged in a pad area NDA-PD.

The input sensing unit ISU may include signal pads DP-PD. The signal pads DP-PD may be arranged in the pad area NDA-PD.

The first signal lines SL1-1 to SL1-5, the second signal lines SL2-1 to SL2-4, and the fifth signal lines SL5-1 to SL5-4 may be disposed in a printed circuit board, may be separately manufactured, and may be coupled to other components.

The pad parts SL-P of the first, second, and fifth signal lines SL1-1 to SL1-5, SL2-1 to SL2-4, and SL5-1 to SL5-4 may be disposed at different areas with the signal pads DP-PD being interposed between the different areas. Since two groups of pad parts SL-P are spaced apart from each other, connection of the printed circuit board may be facilitated, and the configuration of the printed circuit board may be simplified.

The configuration and function of the second signal lines SL2-1 to SL2-4 are substantially analogous to those of the fifth signal lines SL5-1 to SL5-4. The second signal lines SL2-1 to SL2-4 will be described as representative examples. The descriptions related to the second signal lines SL2-1 to SL2-4 may be analogously applied to the fifth signal lines SL5-1 to SL5-4.

The locations of the first signal lines SL1-1 to SL1-5 may be switched with the locations of the second signal lines SL2-1 to SL2-4. Unlike illustrated in FIG. 4, the first signal lines SL1-1 to SL1-5 may be disposed on the right side, and the second signal lines SL2-1 to SL2-4 may be disposed on the left side.

The input sensing unit ISU may further include first sensing lines IL1-1 to IL1-5, third signal lines SL3-1 to SL3-6 coupled to the first sensing lines IL1-1 to IL1-5, second sensing lines IL2-1 to IL2-4, and fourth signal lines SL4-1 to SL4-4 coupled to the second sensing lines IL2-1 to IL2-4.

The first sensing lines IL1-1 to IL1-5 may be arranged in the first direction DR1, and each may extend in the second direction DR2. The second sensing electrodes IL2-1 to IL2-4 may be arranged in the second direction DR2, and each may extend in the first direction DR1. The first sensing lines IL1-1 to IL1-5 may overlap the first sensing electrodes IE1-1 to IE1-5. The second sensing lines IL2-1 to IL2-4 may overlap the second sensing electrodes IE2-1 to IE2-4.

Portions of the first sensing lines IL1-1 to IL1-5 and the second sensing lines IL2-1 to IL2-4 are disposed on the same layer. The first sensing lines IL1-1 to IL1-5 intersect with the second sensing lines IL2-1 to IL2-4. The first sensing lines IL1-1 to IL1-5 may include first sensing line parts and second sensing line parts which are separated from each other near intersections where the first sensing lines IL1-1 to IL1-5 intersect with the second sensing lines IL2-1 to IL2-4. The first sensing line parts and the second sensing line parts may be coupled to each other by third connectors.

In an embodiment, the second sensing lines IL2-1 to IL2-4 may include first sensing line parts and second sensing line parts which are separated from each other near the intersections.

The first sensing lines IL1-1 to IL1-5 and the second sensing lines IL2-1 to IL2-4 may sense an external input in an electromagnetic induction manner. The first sensing lines IL1-1 to IL1-5 and the second sensing lines IL2-1 to IL2-4 may sense a touch input (a second touch input) generated by a digitizer pen or the like.

The third signal lines SL3-1 to SL3-6 are coupled to the first sensing lines IL1-1 to IL1-5. The fourth signal lines SL4-1 to SL4-4 are coupled to the second sensing lines IL2-1 to IL2-4. Pairs among the third signal lines SL3-1 to SL3-6 may be coupled via at least two of first sensing lines IL1-1 to IL1-5. Pairs among the fourth signal lines SL4-1 to SL4-4 may be coupled via at least two of second sensing lines IL2-1 to IL2-4.

Each of the third and fourth signal lines SL3-1 to SL3-6 and SL4-1 to SL4-4 may include a line part connected to a pad part SL-P. In an embodiment, one of the third signal lines SL3-1 to SL3-6 and one of the fourth signal lines SL4-1 to SL4-4 may be coupled to the same pad part SL-P.

Although FIG. 4 illustrates that the pad parts SL-P of the third and fourth signal lines SL3-1 to SL3-6 and SL4-1 to SL4-4 are divided and disposed at opposite sides, the pad parts SL-P of the third and fourth signal lines SL3-1 to SL3-6 and SL4-1 to SL4-4 may be disposed together on one side.

Figure 5A:
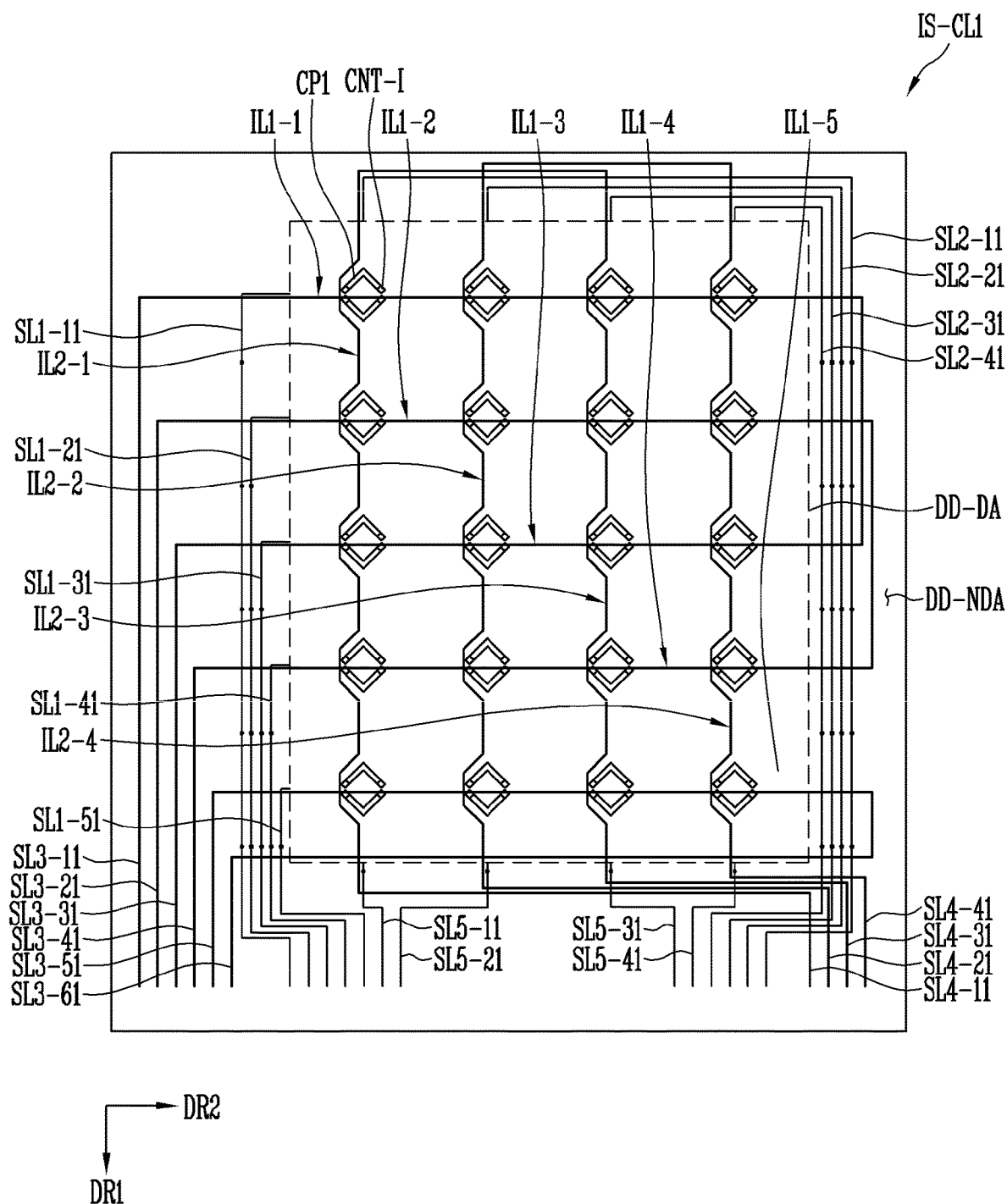
FIG. 5A is a plan view illustrating a first conductive layer of the input sensing unit in accordance with an embodiment.

FIG. 5A is a plan view illustrating the first conductive layer IS-CL1 of the input sensing unit ISU in accordance with an embodiment.

As illustrated in FIG. 5A, the first conductive layer IS-CL1 may include the first connectors CP1. The first conductive layer IS-CL1 may include first line parts SL1-11 to SL1-51 of the first signal lines SL1-1 to SL1-5, first line parts SL2-11 to SL2-41 of the second signal lines SL2-1 to SL2-4, and first line parts SL5-11 to SL5-41 of the fifth signal lines SL5-1 to SL5-4. Furthermore, the first conductive layer IS-CL1 may include the first sensing lines IL1-1 to IL1-5, the second sensing lines IL2-1 to IL2-4, first line parts SL3-11 to SL3-61 of the third signal lines SL3-1 to SL3-6, and first line parts SL4-11 to SL4-41 of the fourth signal lines SL4-1 to SL4-4.

In an embodiment, the first sensing lines IL1-1 to IL1-5 may include the first sensing line parts and the second sensing line parts which are separated from each other around the intersections with the second sensing lines. Such embodiment is described in more detail in FIGS. 6A to 6E.

Although not illustrated in FIG. 5A, the first insulating layer IS-IL1 covers at least the first connectors CP1. In an embodiment, the first insulating layer IS-IL1 may overlap the display area DD-DA and at least portion of the non-display area DD-NDA. The first insulating layer IS-IL1 may cover the first line parts SL1-11 to SL1-51 of the first signal lines SL1-1 to SL1-5, the first line parts SL2-11 to SL2-41 of the second signal lines SL2-1 to SL2-4, the first line parts SL3-11 to SL3-61 of the third signal lines SL3-1 to SL3-6, the first line parts SL4-11 to SL4-41 of the fourth signal lines SL4-1 to SL4-4, and the first line parts SL5-11 to SL5-41 of the fifth signal lines SL5-1 to SL5-4.

In an embodiment, the first insulating layer IS-IL1 may overlap the display area DD-DA and the pad area NDA-PD. In an embodiment, the first insulating layer IS-IL1 may overlap the display area DD-DA and the entirety of the non-display area DD-NDA.

First connection contact holes CNT-I and second connection contact holes CNT-II may be defined in the first insulating layer IS-IL1. The first connection contact holes CNT-I may partially expose the first connectors CP1. The second connection contact holes CNT-II may partially expose opposite ends of the first and second sensing line parts and of the first sensing lines IL1-1 to IL1-5. Furthermore, connection contact holes CNT-S may be defined in the first insulating layer IS-IL1 to partially expose the first line parts SL1-11 to SL1-51 of the first signal lines SL1-1 to SL1-5, the first line parts SL2-11 to SL2-41 of the second signal lines SL2-1 to SL2-4, the first line parts SL3-11 to SL3-61 of the third signal lines SL3-1 to SL3-6, the first line parts SL4-11 to SL4-41 of the fourth signal lines SL4-1 to SL4-4, and the first line parts SL5-11 to SL5-41 of the fifth signal lines SL5-1 to SL5-4.

Figure 5B:
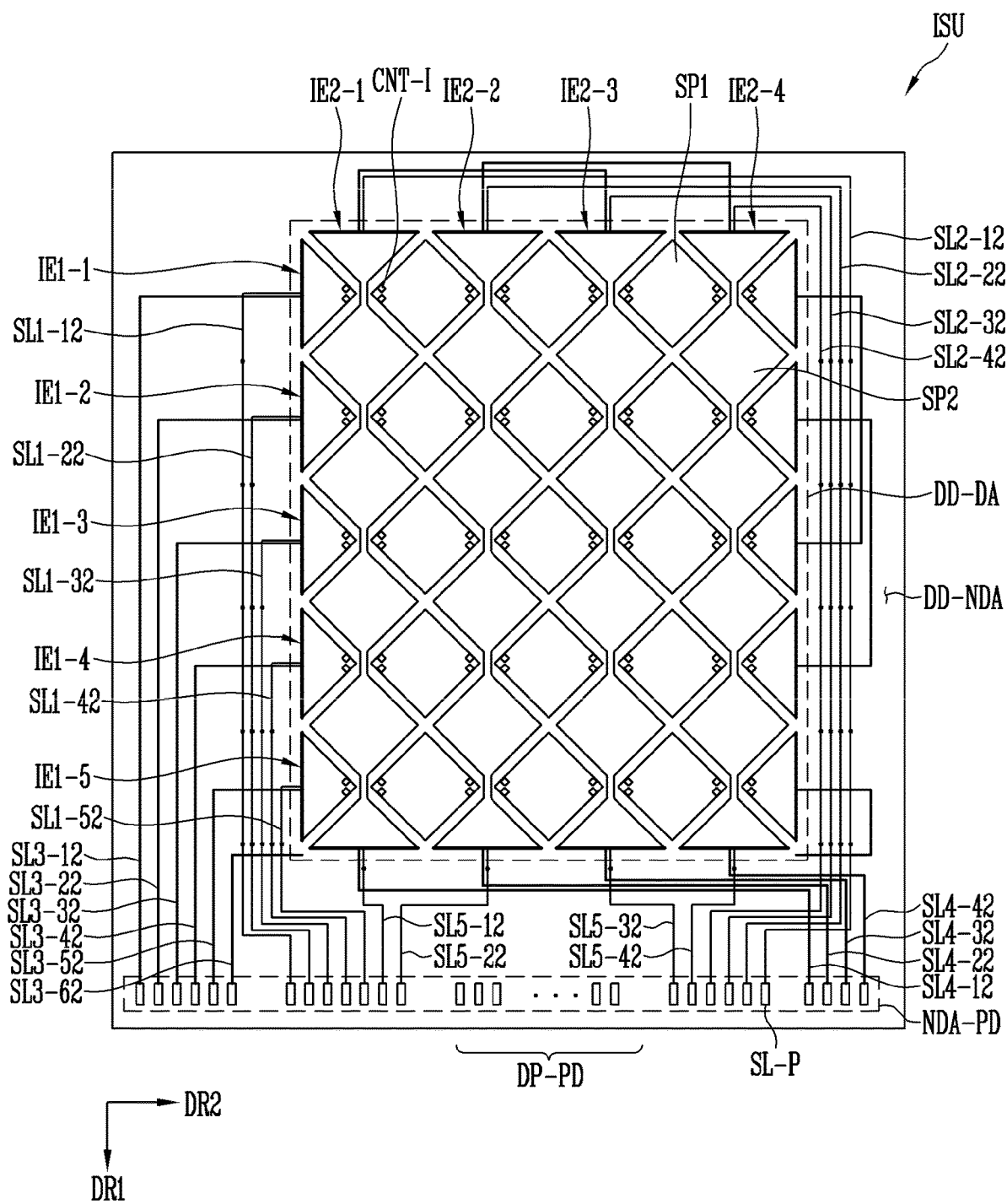
FIG. 5B is a plan view illustrating a second conductive layer of the input sensing unit in accordance with an embodiment.

FIG. 5B is a plan view illustrating the second conductive layer IS-CL2 of the input sensing unit ISU in accordance with an embodiment.

As illustrated in FIG. 5B, the second conductive layer IS-CL2 may include the first sensors SP1, the second sensors SP2, and the second connectors CP2. Each of the second sensing electrodes IE2-1 to IE2-4 may have an integrated shape. The first sensors SP1 are spaced apart from the second sensing electrodes IE2-1 to IE2-4. The first sensors SP1 may be electrically coupled to the first connectors CP1 through the first connection contact holes CNT-I. The first connectors CP1 may include material having resistance lower than that of the first sensors SP1. In an embodiment, the second conductive layer IS-CL2 may further include a portion of each first connector CP1.

The second conductive layer IS-CL2 may further include the third connectors which electrically couple the first sensing line parts and the second sensing line parts of the first sensing lines IL1-1 to IL1-5. The third connectors may electrically couple the first sensing line parts and the second sensing line parts of the first sensing lines IL1-1 to IL1-5 through the second connection contact holes CNT-II (shown in FIG. 6E).

The second conductive layer IS-CL2 may include second line parts SL1-12 to SL1-52 of the first signal lines SL1-1 to SL1-5, the pad parts SL-P of the first signal lines SL1-1 to SL1-5, second line parts SL2-12 to SL2-42 of the second signal lines SL2-1 to SL2-4, the pad parts SL-P of the second signal lines SL2-1 to SL2-4, second line parts SL3-12 to SL3-62 of the third signal lines SL3-1 to SL3-6, the pad parts SL-P of the third signal lines SL3-1 to SL3-6, fourth line parts SL4-12 to SL4-42 of the fourth signal lines SL4-1 to SL4-4, the pad parts SL-P of the fourth signal lines SL4-1 to SL4-4, and second line parts SL5-12 to SL5-42 of the fifth signal lines SL5-1 to SL5-4, and the pad parts SL-P of the fifth signal lines SL5-1 to SL5-4. The second conductive layer IS-CL2 may include the signal pads DP-PD.

Although not illustrated in FIG. 5B, the second insulating layer IS-IL2 may overlap the display area DD-DA and at least portion of the non-display area DD-NDA. In an embodiment, the second insulating layer IS-IL2 may expose the pad read NDA-PD.

Figure 6A:
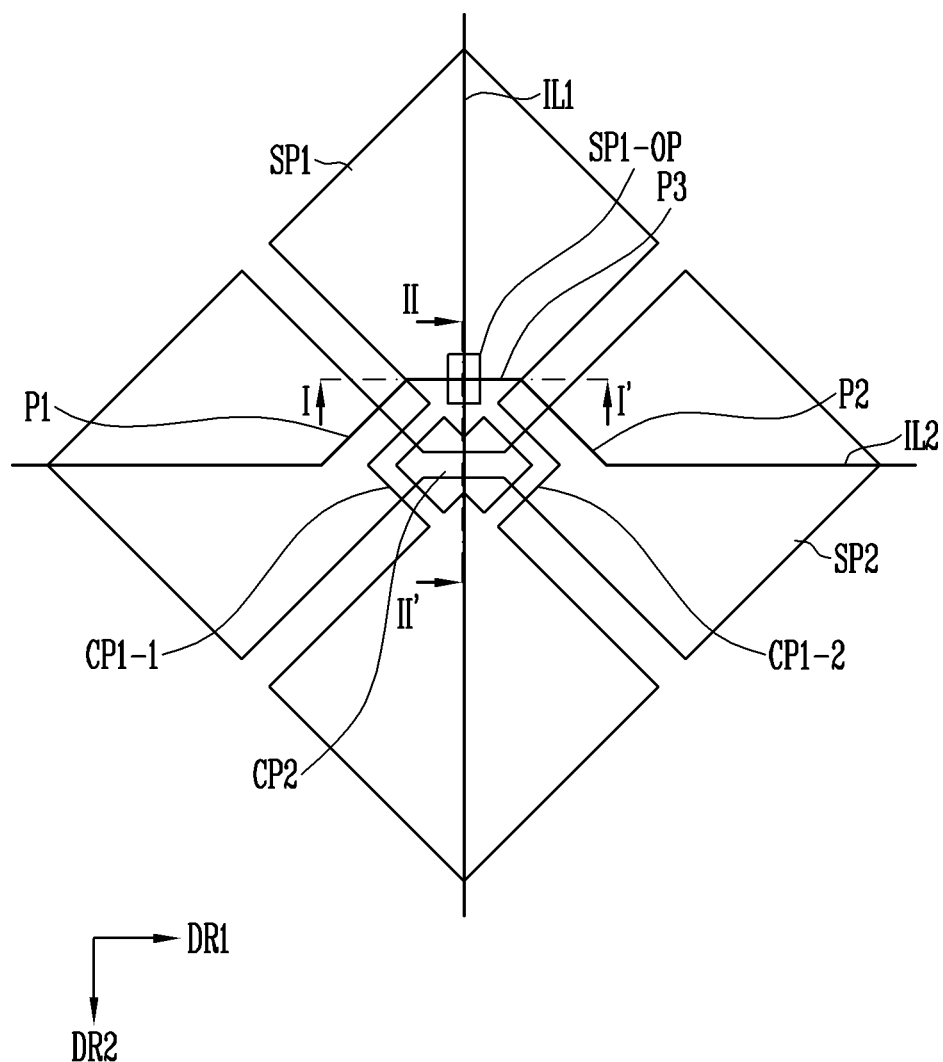
FIG. 6A is a plan view illustrating an intersection area of an input sensing unit in accordance with a first embodiment.
Figure 6C:
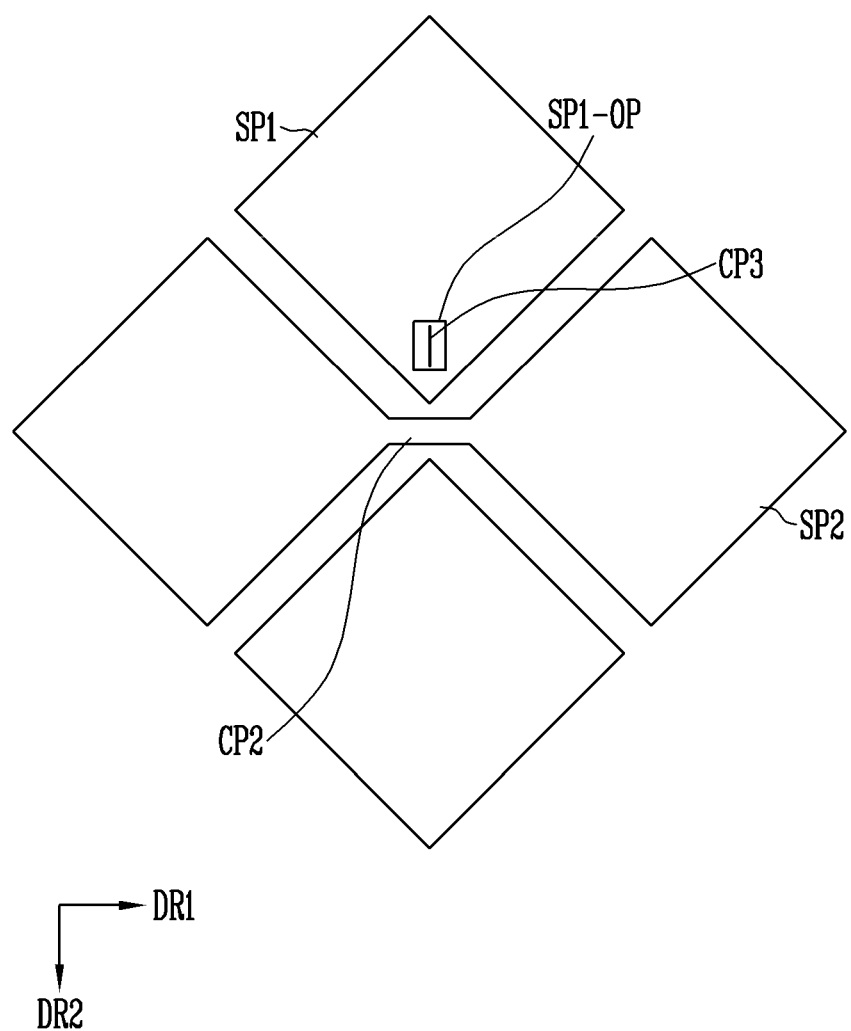
FIG. 6C is a plan view illustrating an intersection area of a second conductive layer of the input sensing unit in accordance with the first embodiment.
Figure 6D:
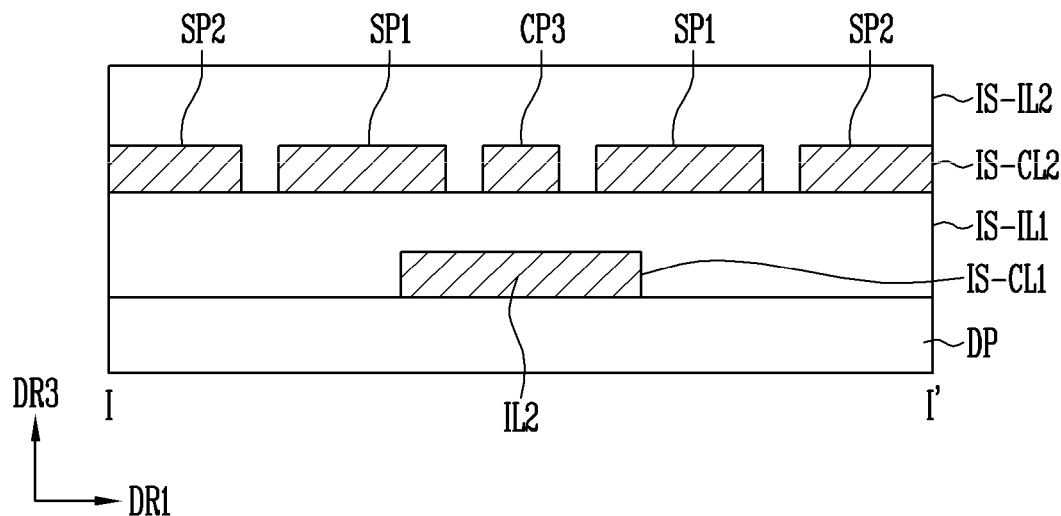
FIG. 6D illustrates an example of a cross-sectional view taken along line I-I' of FIG. 6A.
Figure 6E:
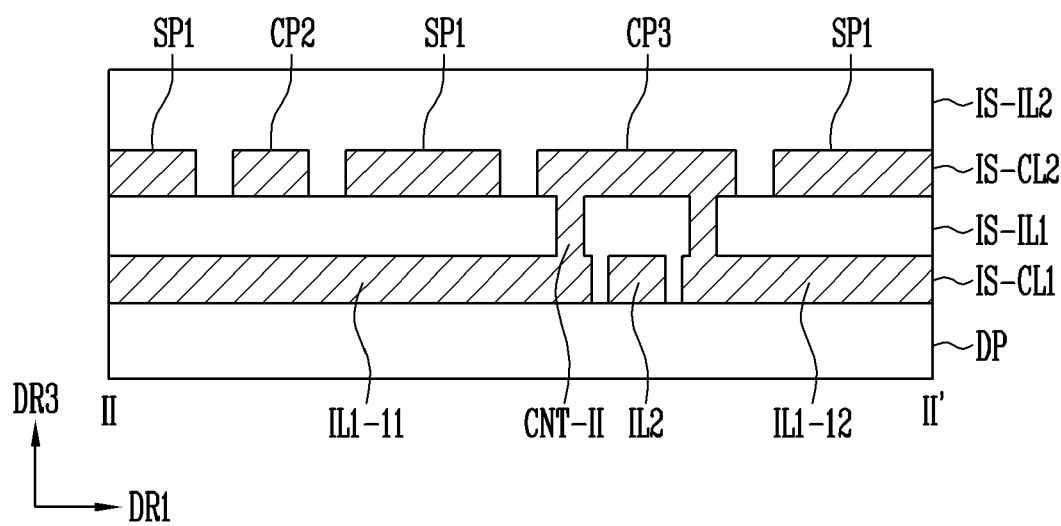
FIG. 6E illustrates an example of a cross-sectional view taken along line II-II' of FIG. 6A.

In an embodiment, the first insulating layer IS-IL1 may be a polymer layer, e.g., an acrylic polymer layer. The second insulating layer IS-IL2 may also be a polymer layer, e.g., an acrylic polymer layer. The polymer layer may enhance the flexibility of the display device DD even if the input sensing unit ISU is directly disposed on the display panel DP. To enhance the flexibility, each of the first sensors SP1 and the second sensors SP2 may have a mesh structure formed of metal lines, and may include metal. Each of the first sensors SP1 and the second sensors SP2 may be designated as a metal mesh pattern. FIG. 6A is a plan view illustrating an intersection area of an input sensing unit ISU in accordance with a first embodiment. FIG. 6B is a plan view illustrating an intersection area of a first conductive layer IS-CL1 of the input sensing unit ISU in accordance with the first embodiment. FIG. 6C is a plan view illustrating an intersection area of a second conductive layer IS-CL2 of the input sensing unit ISU in accordance with the first embodiment. FIG. 6D illustrates an example of a cross-sectional view taken along line I-I' of FIG. 6A. FIG. 6E illustrates an example of a cross-sectional view taken along line II-II' of FIG. 6A.

FIGS. 6A to 6E illustrate an intersection area having the same structure as that of the intersection area illustrated in FIG. 4. Detailed description of substantially the same configuration as that of the display device DD described with reference to FIGS. 1 to 5 may not be repeated.

As shown in FIGS. 6A to 6E, the input sensing unit ISU may include, in each intersection area, a first sensor SP1, a second sensor SP2, a plurality of first connectors CP1-1 and CP1-2, and a second connector CP2. The two first connectors CP1-1 and CP1-2 are included in the first conductive layer IS-CL1. The first sensor SP1, the second sensor SP2, and the second connector CP2 are included in the second conductive layer IS-CL2. The two first connectors CP1-1 and CP1-2 may be electrically coupled with the first sensor SP1 through the first connection contact holes CNT-1 formed in the first insulating layer IS-IL1. The two first connectors CP1-1 and CP1-2 do not intersect with the second connectors CP2.

The intersection area of the input sensing unit ISU may include a first sensing line IL1 and a second sensing line IL2. The first sensing line IL1 and the second sensing line IL2 may be included in the first conductive layer IS-CL1. The first sensing line IL1 and the second sensing line IL2 intersect with each other. The first sensing line IL1 and the second sensing line IL2 do not intersect with the first connectors CP1-1 and CP1-2.

The second sensing line IL2 may include a plurality of patterns P1, P2, and P3. The first pattern P1 and the second pattern P2 extend in oblique directions relative to the first and second directions DR1 and DR2. The third pattern P3 extends in the first direction D1 and connects the first pattern P1 and the second pattern P2. The third pattern P3 is disposed under the first sensor SP1. The third pattern P3 intersects with the first sensing line IL1.

In an embodiment, the first sensing line IL1 may include a plurality of patterns P1, P2, and P3 having the foregoing structure.

The first sensing line IL1 includes a first sensing line part IL1-11 and a second sensing line part IL1-12 which are separated from each other around the third pattern P3.

An opening SP1-OP is defined in the first sensor SP1. A third connector CP3 is disposed in the opening SP1-OP. The third connector CP3 and the first and second sensors SP1 and SP2 may be formed through the same process step(s) and thus have the same stack structure and the same material(s). The third connector CP3 may be formed over the third pattern P3 in the second conductive layer IS-CL2, and may electrically couple the first sensing line part IL1-11 and the second sensing line part IL1-12 of the first sensing line IL1 through the second connection contact holes CNT-II.

Figure 7A:
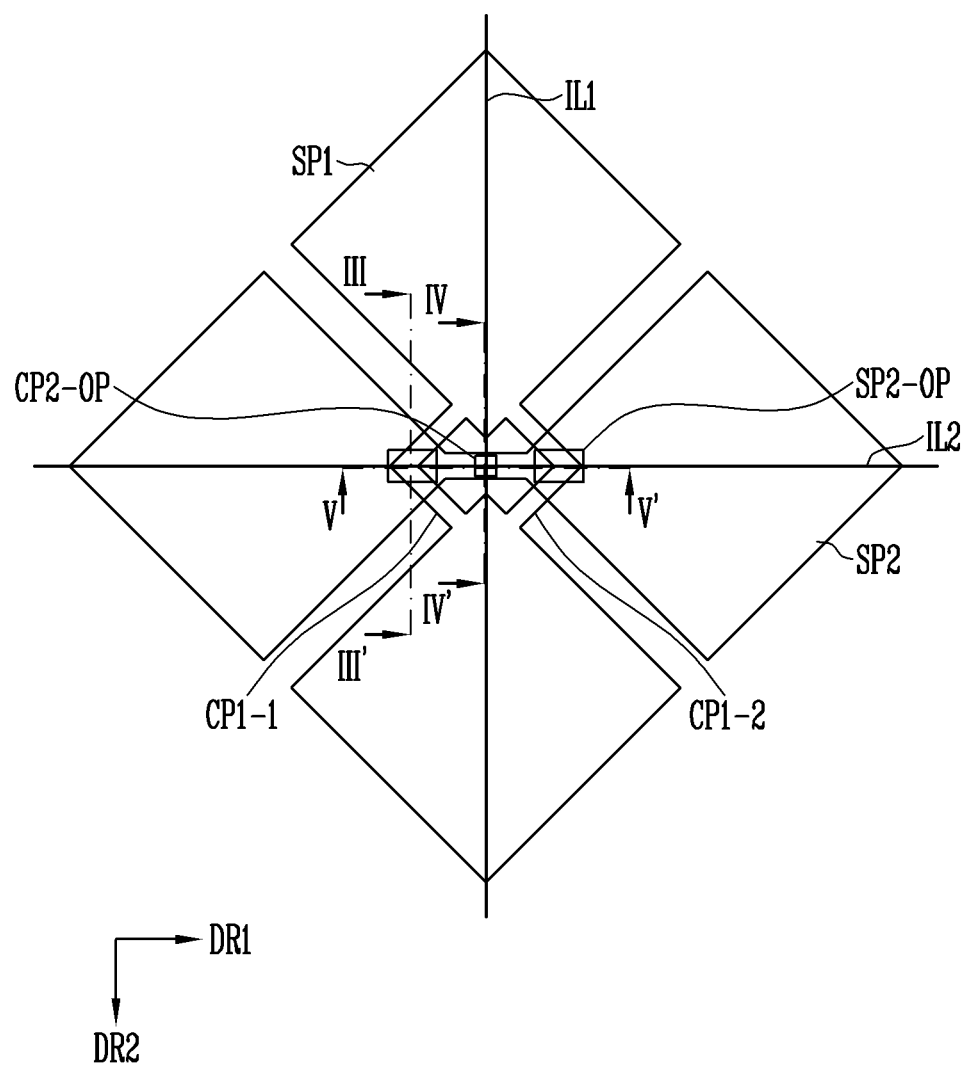
FIG. 7A is a plan view illustrating an intersection area of an input sensing unit in accordance with a second embodiment.
Figure 7B:
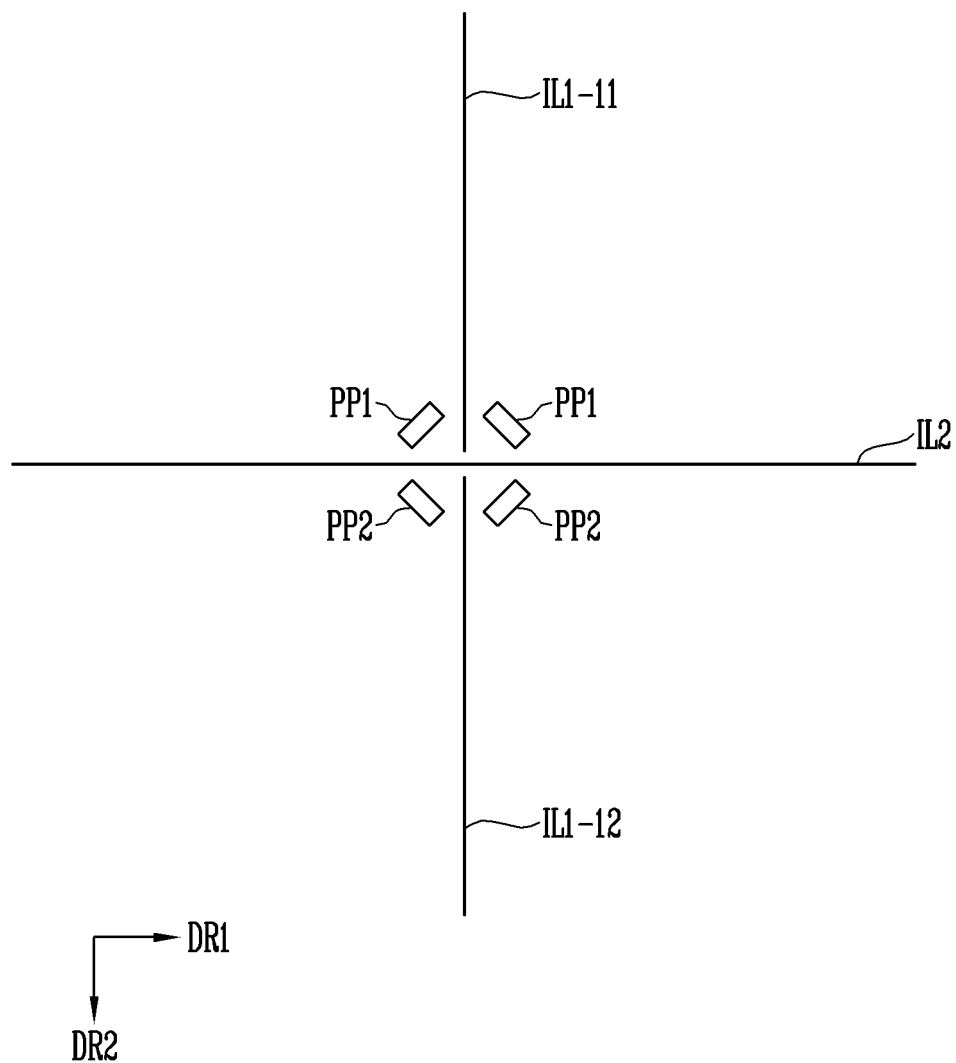
FIG. 7B is a plan view illustrating an intersection area of a first conductive layer of the input sensing unit in accordance with the second embodiment.
Figure 7C:
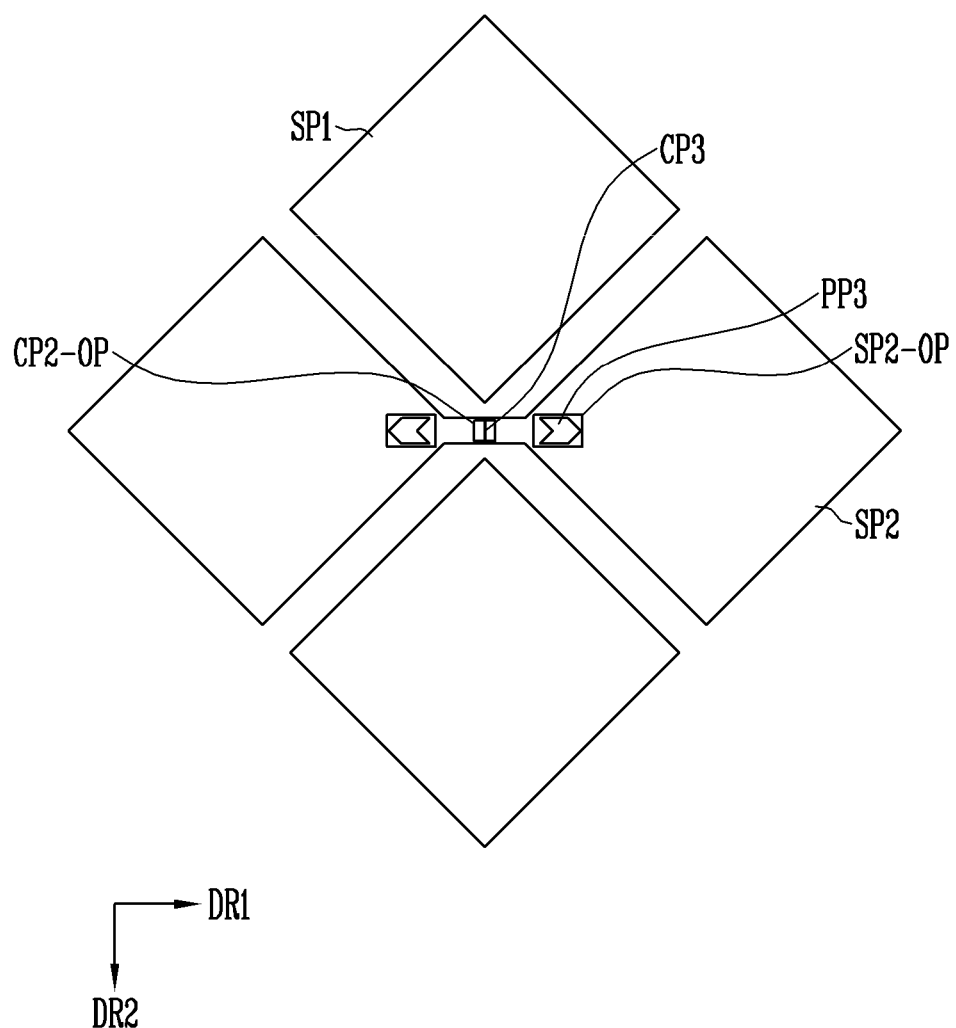
FIG. 7C is a plan view illustrating an intersection area of a second conductive layer of the input sensing unit in accordance with the second embodiment.
Figure 7D:
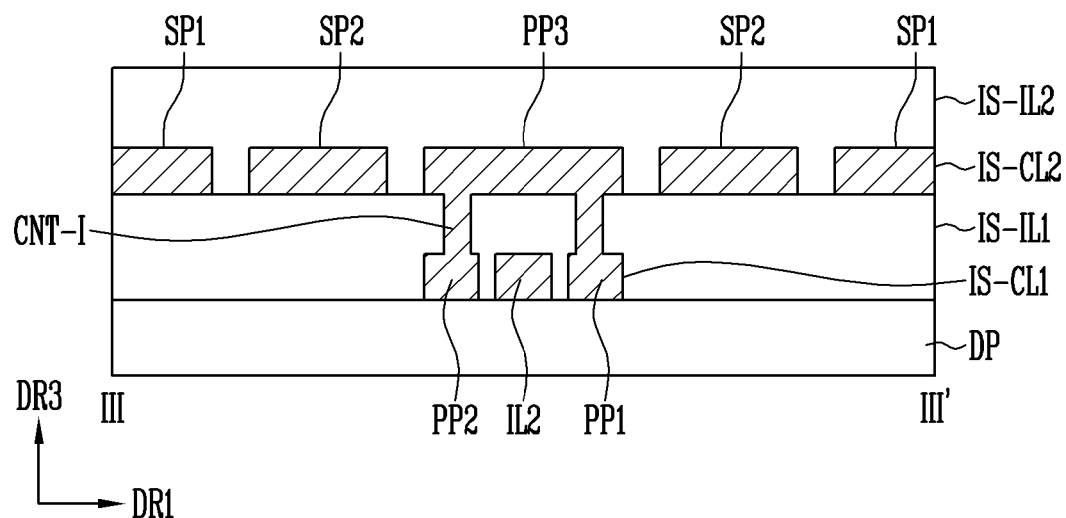
FIG. 7D illustrates an example of a cross-sectional view taken along line III-III' of FIG. 7A.
Figure 7E:
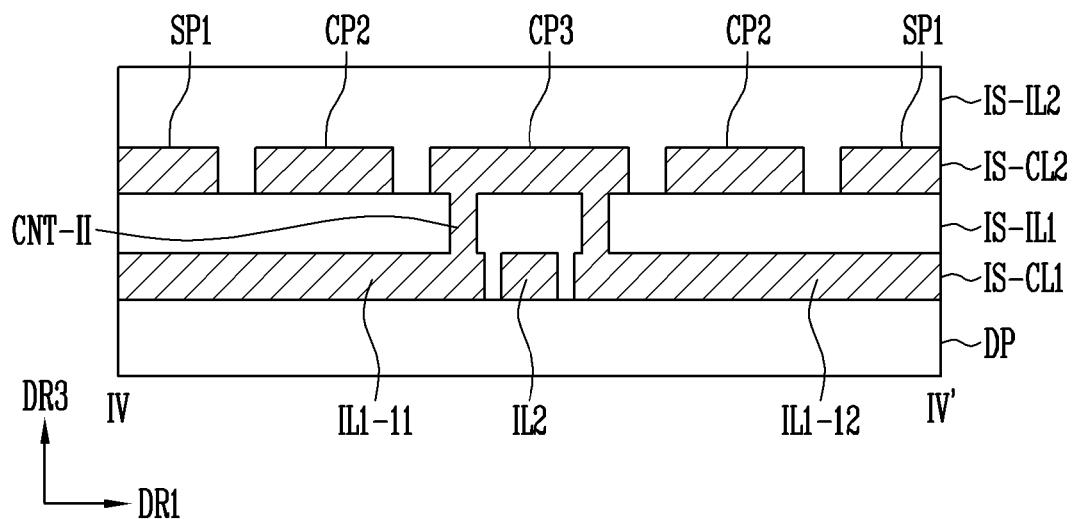
FIG. 7E illustrates an example of a cross-sectional view taken along line IV-IV' of FIG. 7A.
Figure 7F:
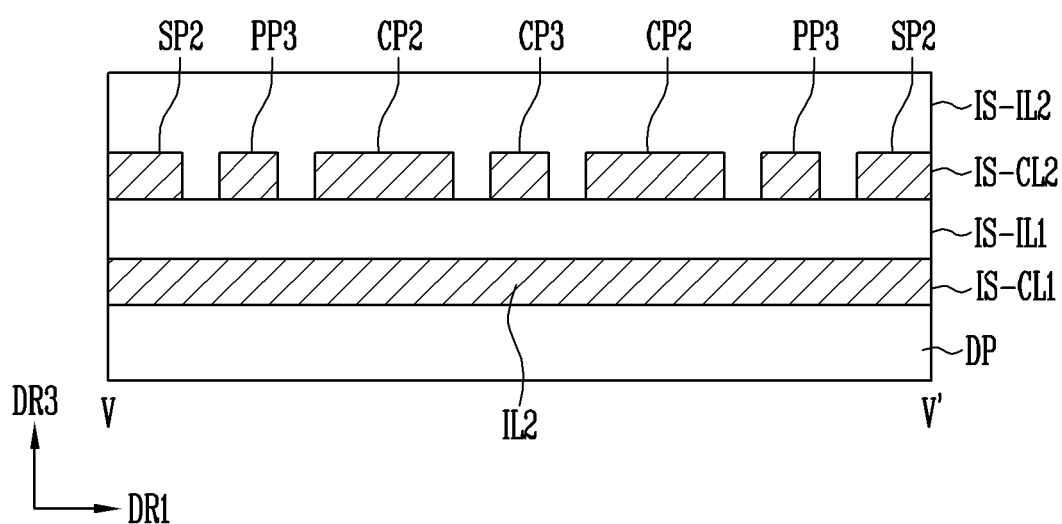
FIG. 7F illustrates an example of a cross-sectional view taken along line V-V' of FIG. 7A.

FIG. 7A is a plan view illustrating an intersection area of an input sensing unit ISU in accordance with a second embodiment. FIG. 7B is a plan view illustrating an intersection area of a first conductive layer IS-CL1 of the input sensing unit ISU in accordance with the second embodiment. FIG. 7C is a plan view illustrating an intersection area of a second conductive layer IS-CL2 of the input sensing unit in accordance with the second embodiment. FIG. 7D illustrates an example of a cross-sectional view taken along line III-III' of FIG. 7A. FIG. 7E illustrates an example of a cross-sectional view taken along line IV-IV' of FIG. 7A. FIG. 7F illustrates an example of a cross-sectional view taken along line V-V' of FIG. 7A.

FIGS. 7A to 7F illustrate the intersection area having a structure different from that of the intersection area illustrated in FIG. 4. Some configurations related to FIGS. 7A to 7F may be substantially the same as some configurations discussed above. Detailed description of substantially the same configurations as those described with reference to one or more of FIGS. 1 to 6E may not be repeated.

As illustrated in FIGS. 7A to 7F, the input sensing unit ISU includes a plurality of first connectors CP1-1 and CP1-2 disposed on each intersection area. Each of the first connectors CP1-1 and CP1-2 may include a plurality of patterns PP1, PP2, and PP3.

The first pattern PP1 and the second pattern PP2 may be included in the first conductive layer IS-CL1, and the third pattern PP3 may be included in the second conductive layer IS-CL2. The first pattern PP1 and the second pattern P2 may electrically couple the third pattern PP3 with the first sensor SP1 through the respective first connection contact holes CNT-I.

An opening SP2-OP is defined in the second sensor SP2. The third pattern PP3 is disposed in the opening SP2-OP. The first pattern PP1 and the second pattern PP2 each may include material having resistance lower than that of the third pattern PP3. The third pattern PP3 and the first and second sensors SP1 and SP2 may be formed through the same process step(s) and thus have the same stack structure and the same material(s).

As illustrated in FIGS. 7A to 7F, the first sensing line IL1 and the second sensing line IL2 respectively extend in the first direction DR1 and the second direction DR2 and each is elongated in a single direction, unlike that of the embodiment of FIG. 6. Due to the foregoing structure, linear characteristics of the first sensing line IL1 and the second sensing line IL2 may be enhanced.

The first sensing line IL1 and the second sensing line IL2 intersect with each other.

An opening CP2-OP is defined in the second connector CP2. A third connector CP3 is disposed in the opening SP2-OP. The third connector CP3 and the second connector CP2 may be formed through the same process step(s) and thus have the same stack structure and the same material(s). The third connector CP3 may electrically couple the first sensing line part IL1-11 and the second sensing line part IL1-12 of the first sensing line IL1 through the second connection contact holes CNT-II.

Figure 8A:
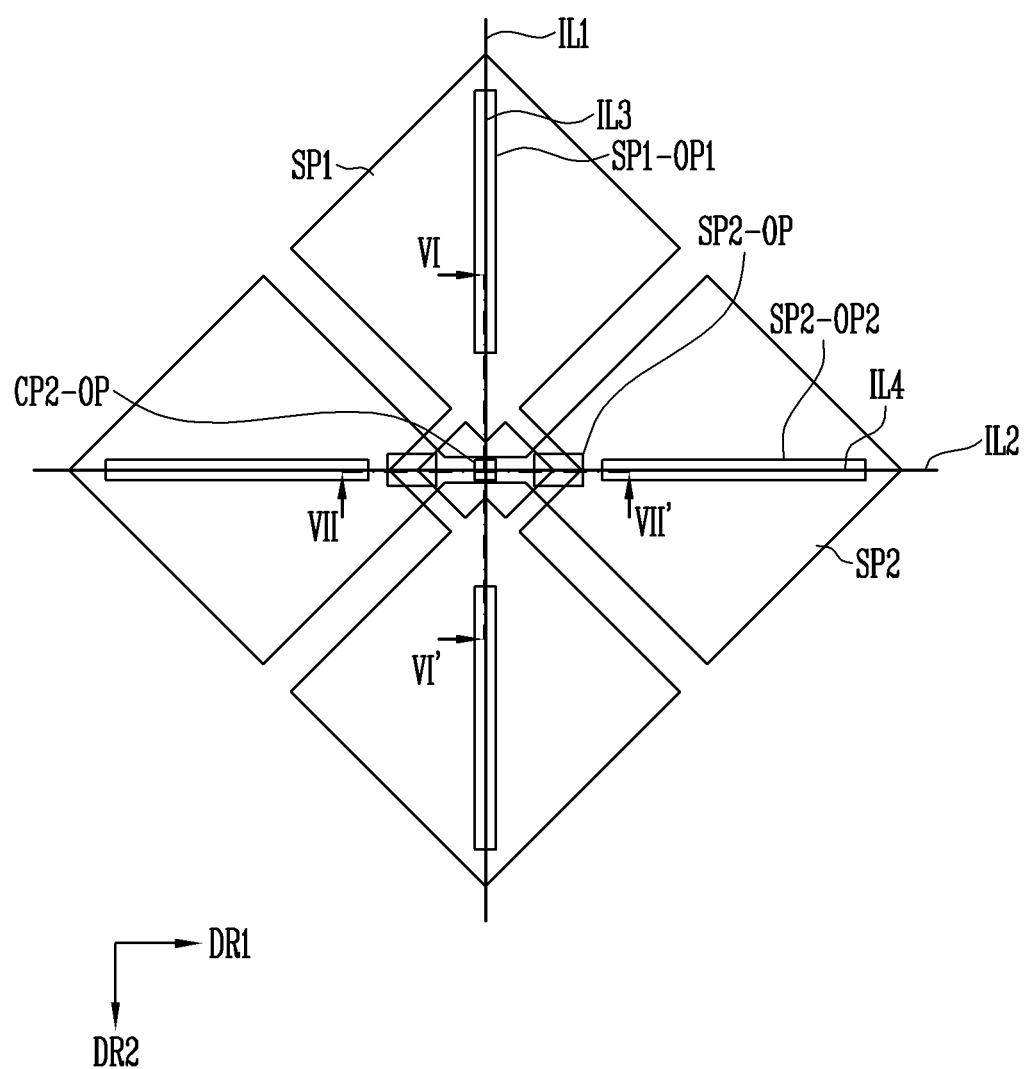
FIG. 8A is a plan view illustrating an intersection area of an input sensing unit in accordance with a third embodiment.
Figure 8B:
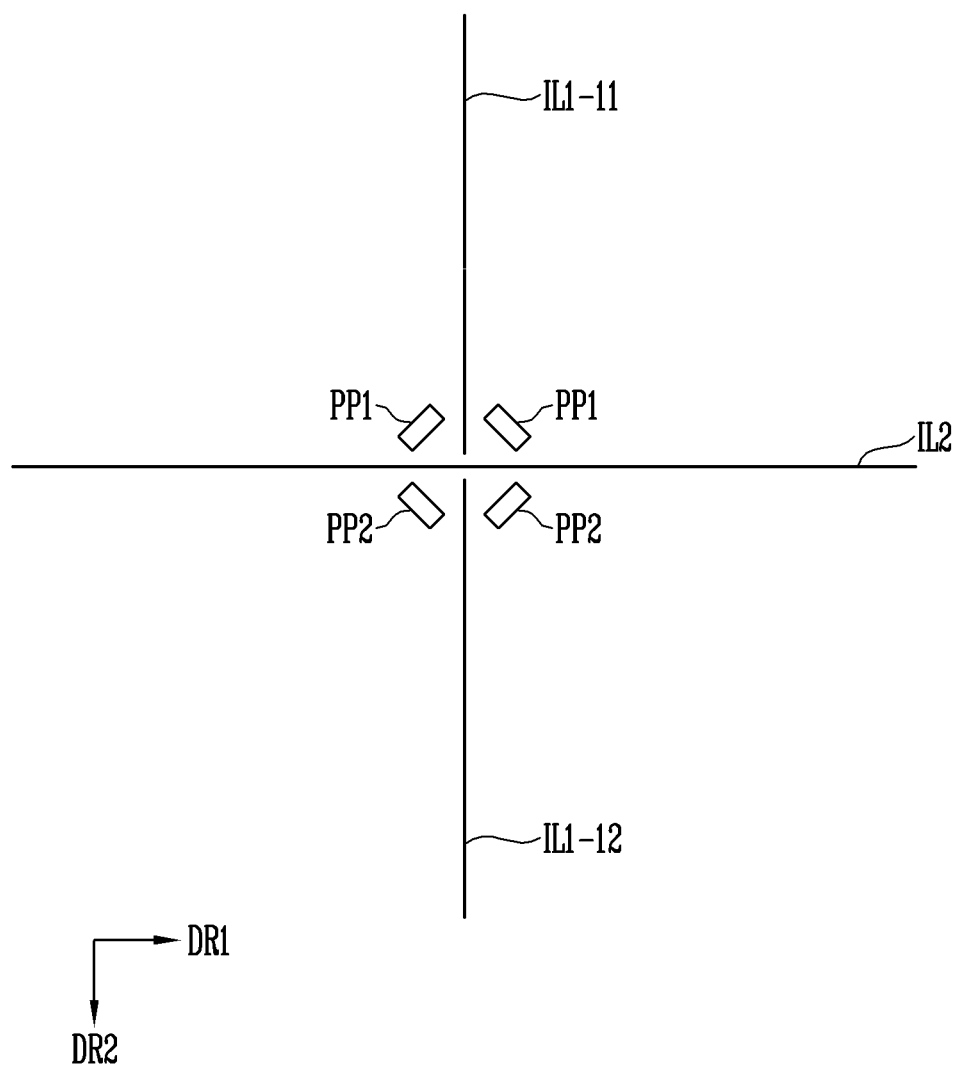
FIG. 8B is a plan view illustrating an intersection area of a first conductive layer of the input sensing unit in accordance with the third embodiment.
Figure 8C:
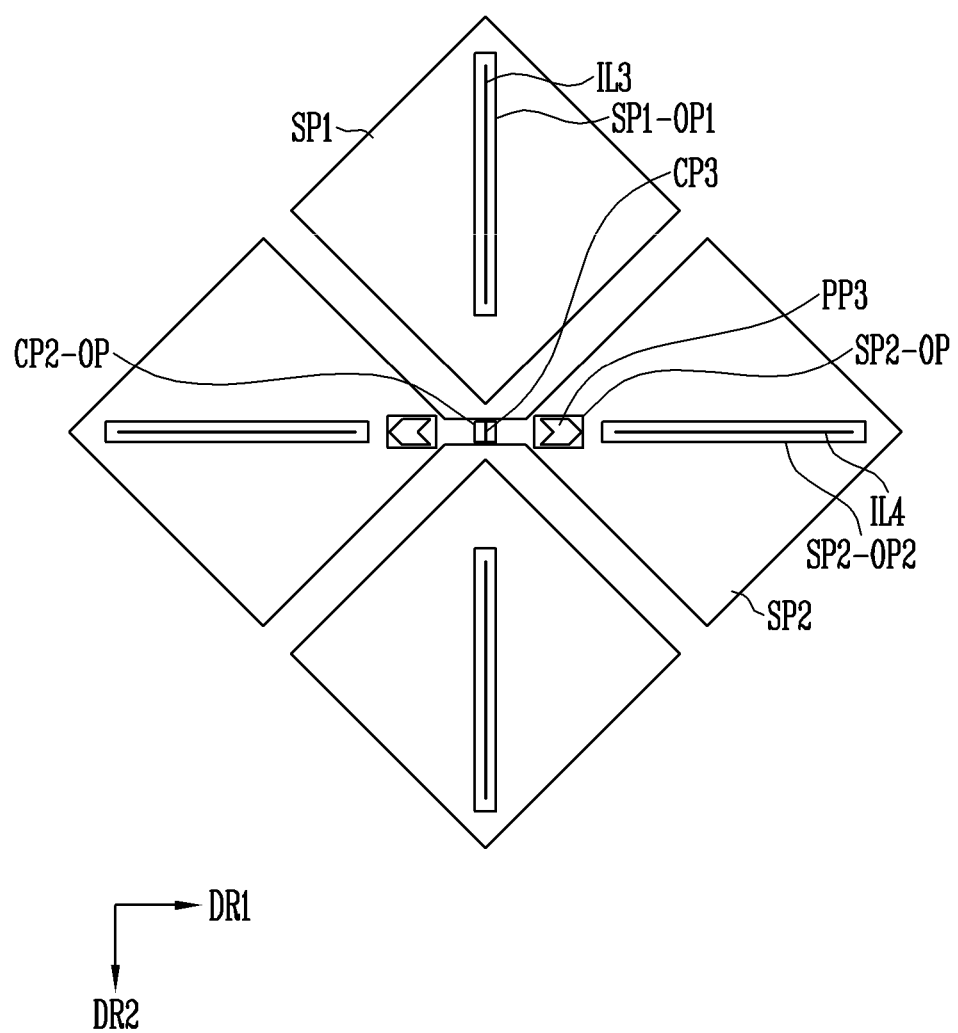
FIG. 8C is a plan view illustrating an intersection area of a second conductive layer of the input sensing unit in accordance with the third embodiment.
Figure 8D:
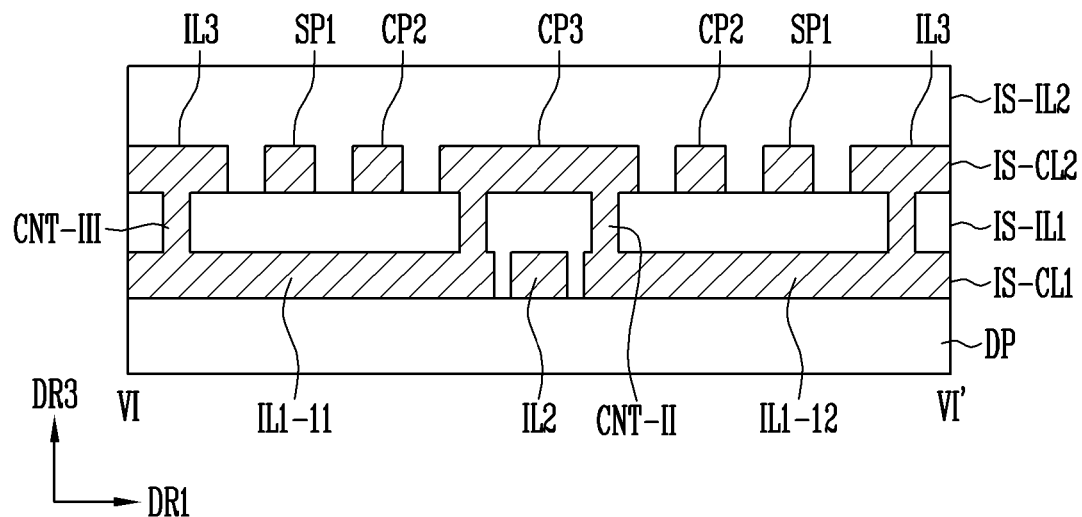
FIG. 8D illustrates an example of a cross-sectional view taken along line VI-VI' of FIG. 8A.
Figure 8E:
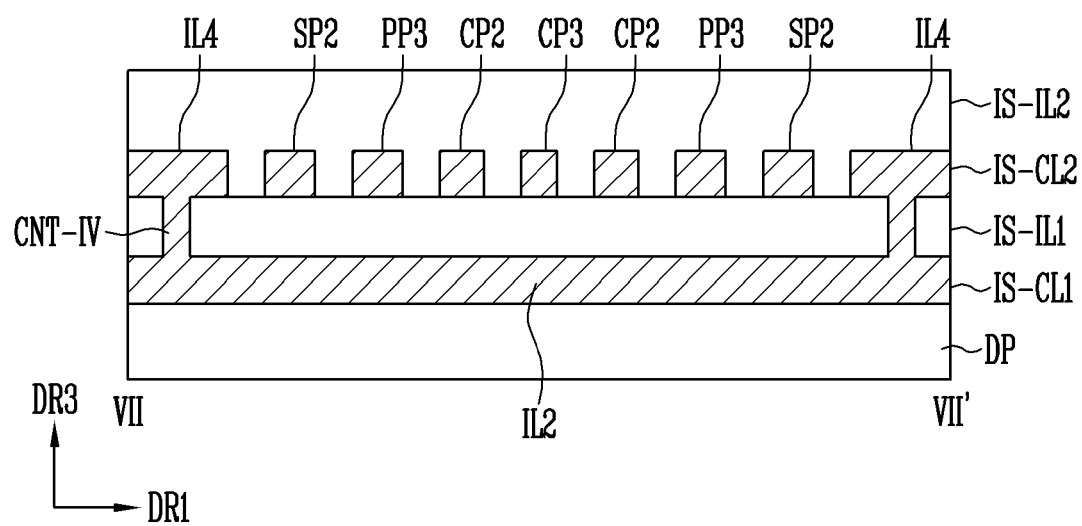
FIG. 8E illustrates an example of a cross-sectional view taken along line VII-VII' of FIG. 8A.

FIG. 8A is a plan view illustrating an intersection area of an input sensing unit ISU in accordance with a third embodiment. FIG. 8B is a plan view illustrating an intersection area of a first conductive layer IS-CL1 of the input sensing unit ISU in accordance with the third embodiment. FIG. 8C is a plan view illustrating an intersection area of a second conductive layer IS-CL2 of the input sensing unit ISU in accordance with the third embodiment. FIG. 8D illustrates an example of a cross-sectional view taken along line VI-VI' of FIG. 8A. FIG. 8E illustrates an example of a cross-sectional view taken along line VII-VII' of FIG. 8A.

FIGS. 8A to 8F illustrate the intersection area having a structure similar to that of the intersection area illustrated in FIGS. 7A to 7F. Some configurations related to FIGS. 8A to 8F may be substantially the same as some configurations discussed above. Detailed description of substantially the same configurations described with reference to one or more of FIGS. 1 to 7F may not be repeated.

As illustrated in FIGS. 8A to 8F, the input sensing unit ISU may include a first sensor SP1 and a second sensor SP2 which are disposed in each intersection area. A first opening SP1-OP1 and a second opening SP2-OP2 are respectively defined in the first sensor SP1 and the second sensor SP2. A third sensing line IL3 and a fourth sensing line IL4 are respectively disposed in the first opening SP1-OP1 and the second opening SP2-OP2. The third sensing line IL3 and the fourth sensing line IL4 may be formed through the same process step(s) as that of the first sensor SP1 and the second sensor SP2 and thus have the same stack structure and the same material(s) as those of the first sensor SP1 and the second sensor SP2.

The third sensing line IL3 is electrically coupled with the first sensing line IL1 through at least one or more third connection contact holes CNT-III, thus substantially performing the same function as that of the first sensing line IL1. The fourth sensing line IL4 is electrically coupled with the second sensing line IL2 through at least one or more fourth connection contact holes CNT-IV, thus substantially performing the same function as that of the second sensing line IL2. Linear resistance of the sensing lines may be reduced through the first and third sensing lines IL1 and IL3 and the second and fourth sensing lines IL2 and IL4 that have multi-layer structures.

Figure 9A:
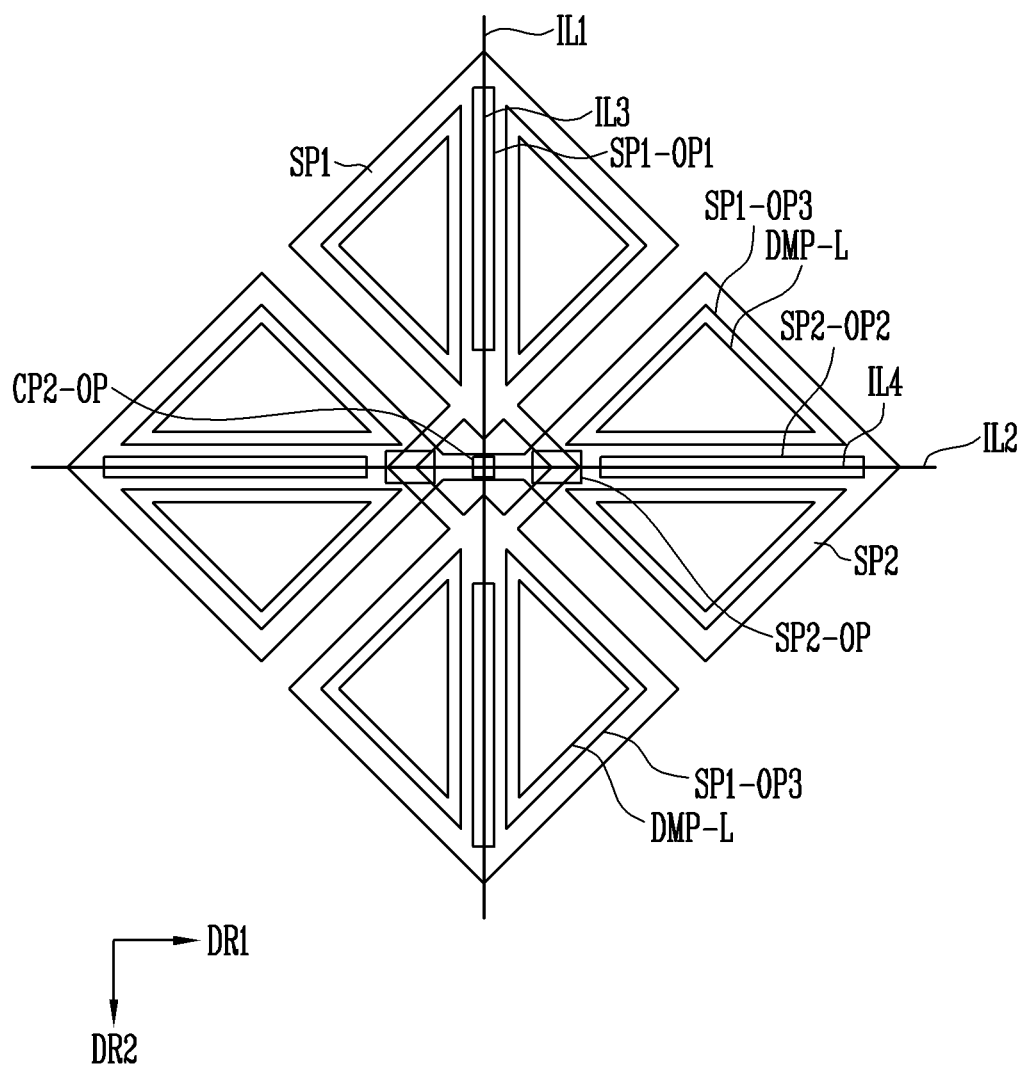
FIG. 9A is a plan view illustrating an intersection area of an input sensing unit in accordance with a fourth embodiment.
Figure 9C:
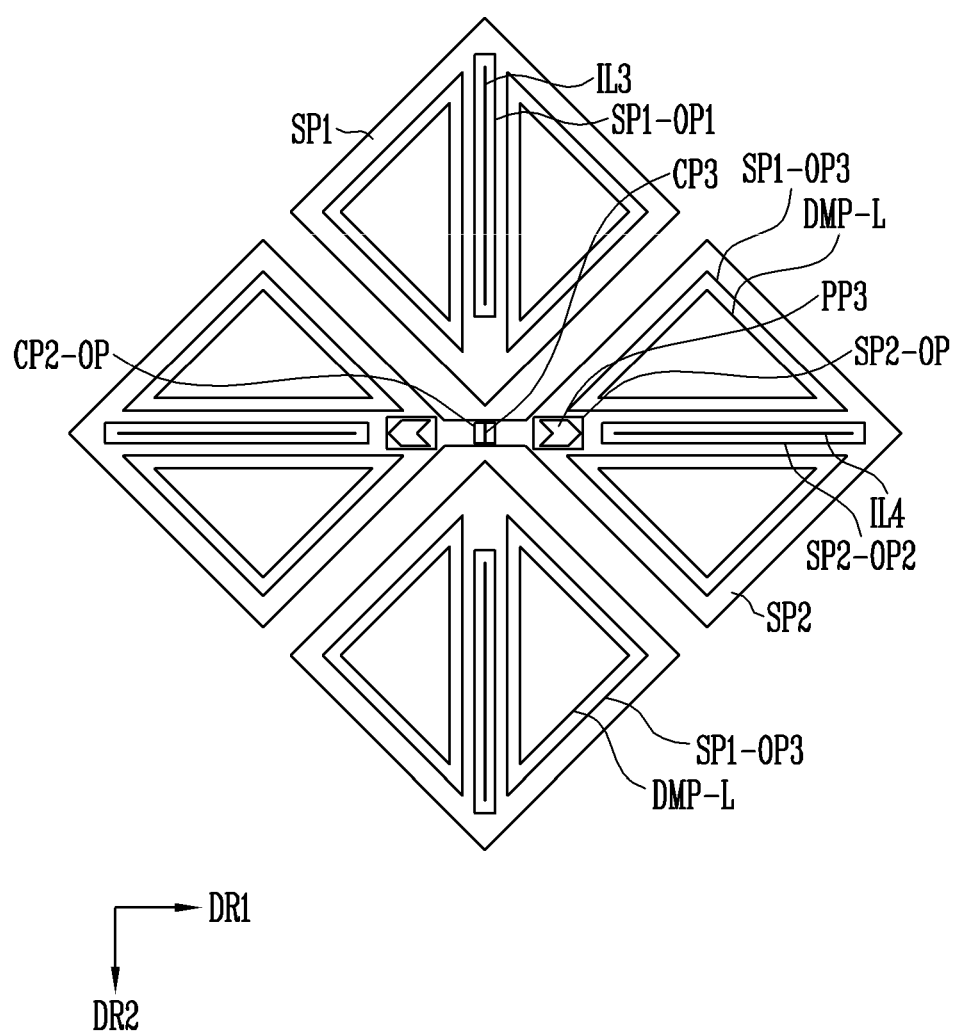
FIG. 9C is a plan view illustrating an intersection area of a second conductive layer of the input sensing unit in accordance with the fourth embodiment.

FIG. 9A is a plan view illustrating an intersection area of an input sensing unit ISU in accordance with a fourth embodiment. FIG. 9B is a plan view illustrating an intersection area of a first conductive layer IS-CL1 of the input sensing unit ISU in accordance with the fourth embodiment. FIG. 9C is a plan view illustrating an intersection area of a second conductive layer IS-CL2 of the input sensing unit ISU in accordance with the fourth embodiment.

FIGS. 9A to 9C illustrate the intersection area having a structure similar to that of the intersection area illustrated in FIG. 8A to 8E. Some configurations related to FIGS. 9A to 8C may be substantially the same as some configurations discussed above. Detailed description of substantially the same configurations as those described with reference to one or more of FIGS. 1 to 8E may not be repeated.

As illustrated in FIGS. 9A to 9C, the input sensing unit ISU may include a first sensor SP1 and a second sensor SP2 which are disposed in each intersection area. A third opening SP1-OP3 and a fourth opening SP2-OP4 are respectively defined in the first sensor SP1 and the second sensor SP2. An optical dummy electrode DMP-L may be formed in each of the third and fourth openings SP1-OP3 and SP2-OP4.

The optical dummy electrode DMP-L is a floating electrode which is electrically coupled neither to the first sensor SP1 nor to the second sensor SP2. Since the optical dummy electrode DMP-L is disposed, the visibility of a boundary area between the first sensor SP1 and the second sensor SP2 may be reduced. Although not illustrated, optical dummy electrodes DMP-L may also be applied to discussed one or more structures discussed with reference to one or more of FIG. 1 to FIG. 8E.

Figure 10A:
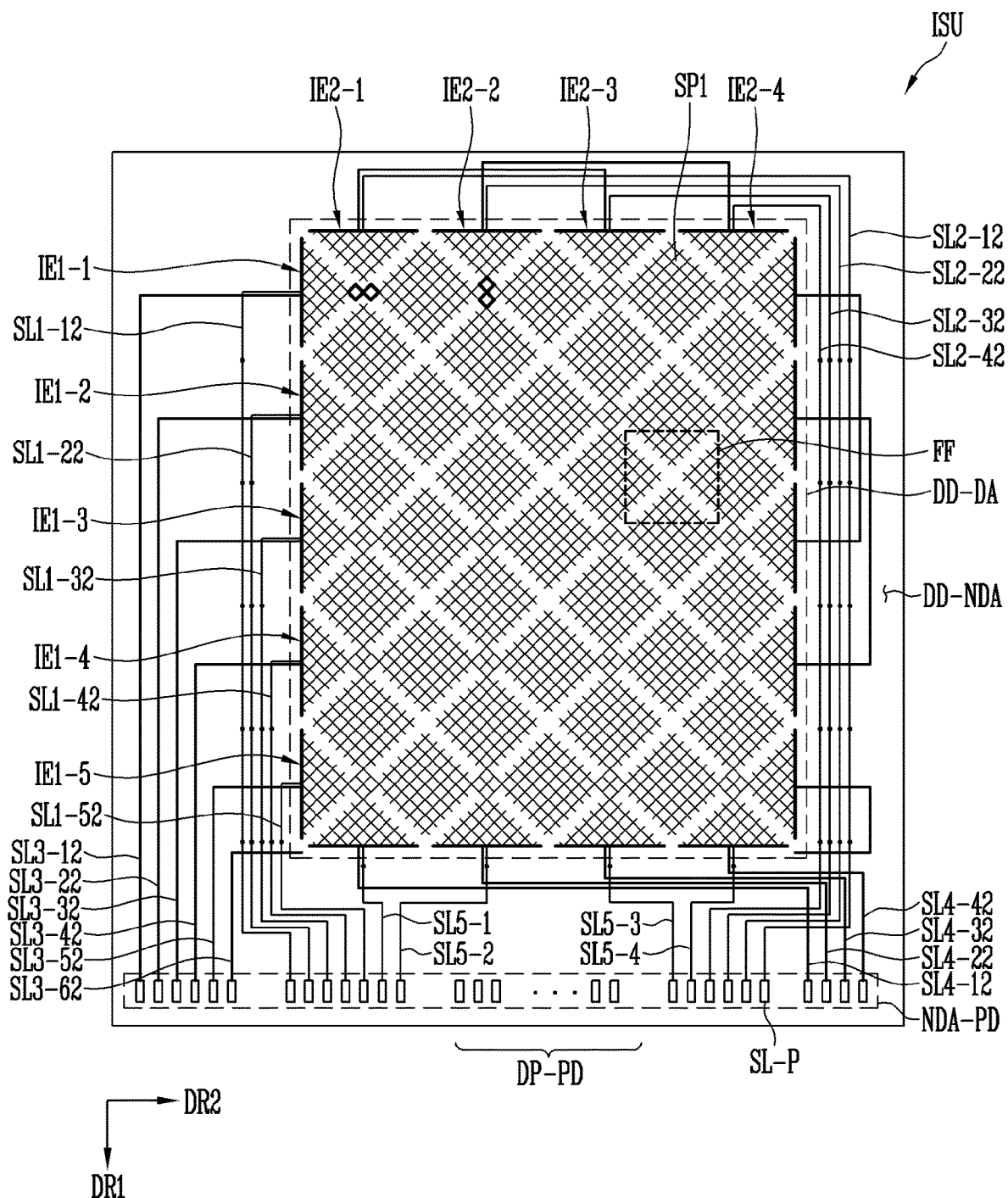
FIG. 10A is a plan view illustrating an input sensing unit in accordance with an embodiment.
Figure 10B:
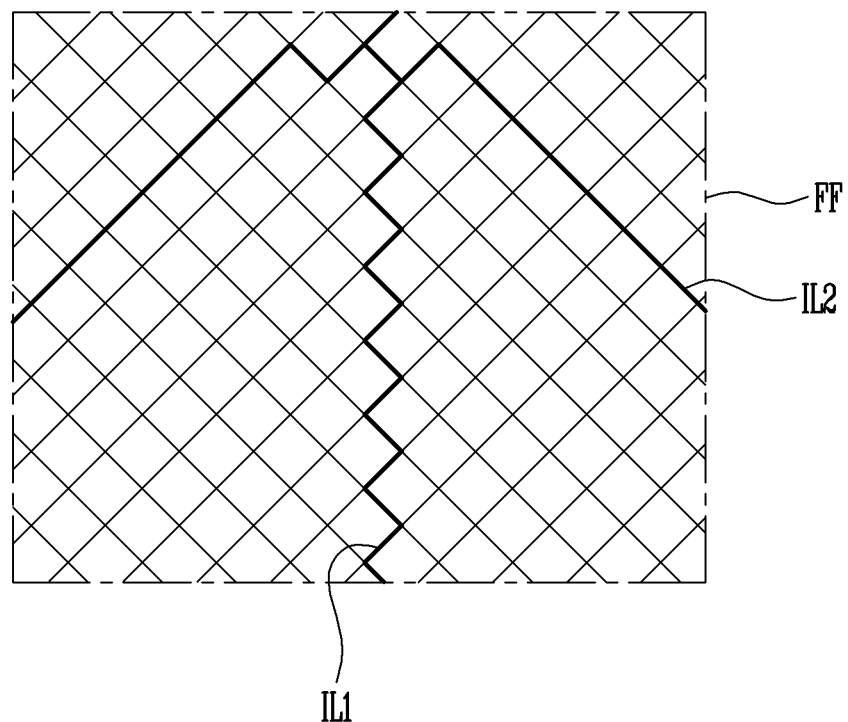
FIG. 10B is a diagram illustrating a portion FF of FIG. 10A.

FIG. 10A is a plan view illustrating an input sensing unit ISU in accordance with an embodiment. FIG. 10B is a diagram illustrating a portion FF of FIG. 10A. FIG. 10 is a diagram corresponding to FIG. 4. Detailed description of substantially the same configurations as those described with reference to FIG. 4 may not be repeated.

As illustrated in FIG. 10, each of the first sensing electrodes IE1-1 to IE1-5 and the second sensing electrodes IE2-1 to IE2-4 may have a mesh shape (or mesh structure). Since each of the first sensing electrodes IE1-1 to IE1-5 and the second sensing electrodes IE2-1 to IE2-4 has a mesh shape, a parasitic capacitance between it and the electrodes of the display panel DP (refer to FIG. 3) may be minimized.

The mesh shape of the first sensing electrodes IE1-1 to IE1-5 and the second sensing electrodes IE2-1 to IE2-4 may include metal sections made of at least one of silver, aluminum, copper, chrome, nickel, titanium, and so forth, and may be formed through a low temperature process.

Sections of the first sensing lines IL1 to IL4 may extend along edges of the mesh shapes, parallel to metal lines of the mesh shapes, and oblique relative to an edge of the input sensing unit. Sections of the second sensing lines IL2 to IL4 may extend along edges of the mesh shapes, parallel to metal lines of the mesh shapes, and oblique relative to an edge of the input sensing unit.

Figure 11A:
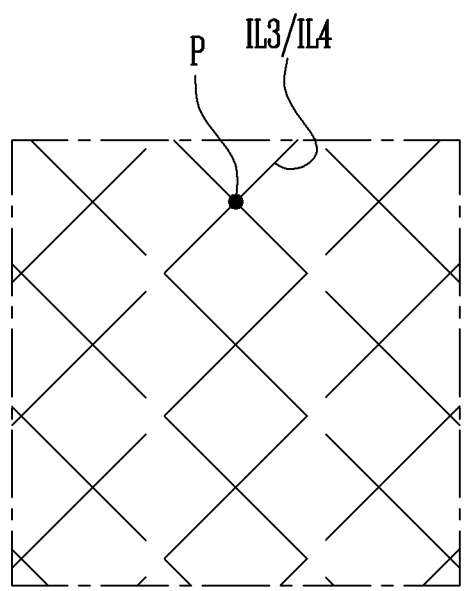
FIG. 11A is a plan view illustrating a sensing line in accordance with an embodiment.
Figure 11B:
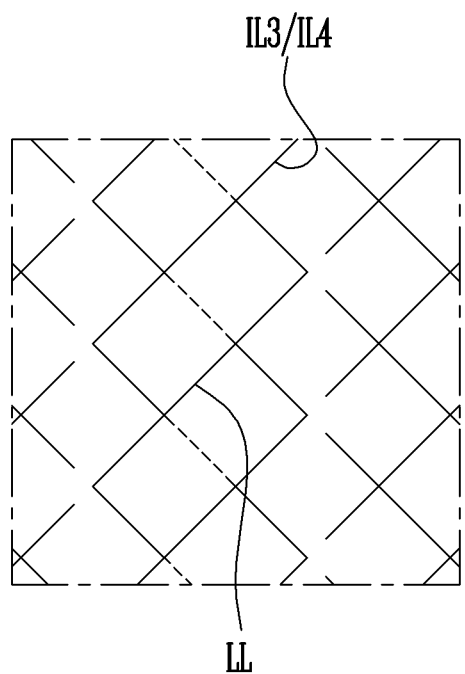
FIG. 11B is a plan view illustrating a sensing line in accordance with an embodiment.

FIG. 11A is a plan view illustrating a sensing line in accordance with an embodiment. FIG. 11B is a plan view illustrating a sensing line in accordance with an embodiment.

FIGS. 11A and 11B illustrate shapes/structures of the third sensing line IL3 and the fourth sensing line IL4 according to the embodiments of FIGS. 8A to 8E and 9A to 9C. Each of the first sensing electrodes IE1-1 to IE1-5 and the second sensing electrodes IE2-1 to IE2-4 may have a mesh shape, as illustrated in FIGS. 10A to 10B.

Referring to FIG. 8C, FIG. 9C, FIG. 10A, and FIG. 11A, an electrode may be formed in an opening of the first sensing electrode TEL The electrode may include metal lines which are directly coupled to each other at a plurality of intersection points P. The electrode may form the third sensing line IL3. The electrode is electrically coupled with the first sensing line IL1 through at least one or more third connection contact holes CNT-III, thus substantially performing the same function as that of the first sensing line IL1.

Likewise, an electrode may be formed in an opening of the second sensing electrode IE2. The electrode may include metal lines which are directly coupled to each other at a plurality of intersection points P. The electrode may form the fourth sensing line IL4. The electrode is electrically coupled with the second sensing line IL2 through at least one or more fourth connection contact holes CNT-IV, thus substantially performing the same function as that of the second sensing line IL2.

Referring to FIG. 8C, FIG. 9C, FIG. 10A, and FIG. 11B, an electrode may be formed in an opening of the first sensing electrode TEL The electrode may include at least two metal lines which are spaced apart from each other. The at least two metal lines are indirectly coupled to each other by at least one connection metal line LL. The electrode may form the third sensing line IL3. The electrode is electrically coupled with the first sensing line IL1 through at least one or more third connection contact holes CNT-III, thus substantially performing the same function as that of the first sensing line IL1.

Likewise, an electrode may be formed in an opening of the second sensing electrode IE2. The electrode may include at least two metal lines which are spaced apart from each other. The at least two metal lines are indirectly coupled to each other by at least one connection metal line LL. The floating electrode may form the fourth sensing line IL4. The electrode is electrically coupled with the second sensing line IL2 through at least one or more fourth connection contact holes CNT-IV, thus substantially performing the same function as that of the second sensing line IL2.

In a touch panel and a display device including the touch panel according to an embodiment, the touch panel is integrally provided with a digitizer, so that the thickness and weight of the display device may be minimized.

A touch panel and a display device including the touch panel according to an embodiment do not require a separate PCB attaching process for the digitizer, such that the process failure rate and the production cost may be minimized.

The described embodiments are illustrative. Practical embodiments may be implemented in different forms without departing from the scope defined by the accompanying claims.

What is claimed is:

1. An input sensing unit, comprising:
   a first sensing electrode including first sensors and a first connector coupling the first sensors;
   a second sensing electrode including second sensors and a second connector coupling the second sensors;
   a first sensing line including first sensing line parts and a third connector coupling the first sensing line parts;
   a second sensing line; and
   wherein the first sensing line parts and the second sensing line are disposed in a first conductive layer,
   wherein the first sensors and the second sensors are disposed in a second conductive layer,
   wherein the first sensing electrode and the second sensing electrode are configured to sense an input generated by a body of a user, and
   wherein the first sensing line and the second sensing line are configured to sense an input generated by a digitizer pen.

2. The input sensing unit according to claim 1, further comprising:
   an insulating layer disposed between the first conductive layer and the second conductive layer,
   wherein the insulating layer includes a first insulating side and a second insulating side opposite the first insulating side,
   wherein the first sensing line parts at least partially overlap the first sensors and are disposed on the first insulating side,
   wherein the second sensing line at least partially overlaps the second sensors and is disposed on the first insulating side, and
   wherein the first sensors and the second sensors are disposed on the second insulating side.

3. The input sensing unit according to claim 2,
   wherein the third connector is disposed on the second insulating side and electrically couples the first sensing line parts through at least one connection contact hole positioned in the insulating layer.

4. The input sensing unit according to claim 1, wherein the third connector is disposed in an opening positioned in either a first sensor of the first sensors or a second sensor of the second sensors.

5. The input sensing unit according to claim 1, wherein the first sensing electrode intersects the second sensing electrode.

6. The input sensing unit according to claim 2, wherein the second sensing line comprises:
   a first section extending obliquely with respect to the first sensing line parts in a plan view of the input sensing unit;
   a second section extending perpendicular to the first section in the plan view of the input sensing unit; and
   a third section extending perpendicular to the first sensing line parts in the plan view of the input sensing unit and coupling the first section to the second section.

7. The input sensing unit according to claim 6, wherein the third section intersects the third connector with a portion of the insulating layer being interposed between the third section and the third connector.

8. The input sensing unit according to claim 2, wherein one of the first connector and the second connector is disposed on the first insulating side, and wherein the other of the first connector and the second connector is disposed on the second insulating side.

9. The input sensing unit according to claim 2, wherein the third connecter intersects the second sensing line, and the third connector is disposed in an opening positioned in one of the first connector and the second connector.

10. The input sensing unit according to claim 9, wherein the third connector intersects the second sensing line with a portion of the insulating layer being interposed between the third connector and the second sensing line.

11. The input sensing unit according to claim 9, wherein one of the first connector and the second connector comprises:
   a first section and a second section disposed on the first insulating side; and
   a third section disposed on the second insulating side and electrically coupled to the first section and the second section through one or more connection contact holes.

12. The input sensing unit according to claim 11, wherein the third section is disposed in an opening positioned in one of the first sensors or one of the second sensors that is coupled to the other of the first connector and the second connector.

13. The input sensing unit according to claim 9, further comprising:
   a third sensing line disposed in a first opening positioned in a first sensor among the first sensors; and
   a fourth sensing line disposed in a second opening positioned in a second sensor among the second sensors.

14. The input sensing unit according to claim 13,
   wherein the third sensing line is electrically coupled with one of the first sensing line and the second sensing line through at least one first connection contact hole, and
   wherein the fourth sensing line is electrically coupled with the other of the first sensing line and the second sensing line through at least one second connection contact hole.

15. The input sensing unit according to claim 13 wherein a material of the third sensing line and the fourth sensing line is identical to a material of the first sensors and the second sensors.

16. The input sensing unit according to claim 13, further comprising:
   first dummy electrodes disposed in third openings positioned in the first sensors; and
   second dummy electrodes disposed in fourth openings positioned in the second sensors.

17. The input sensing unit according to claim 1, wherein each of the first sensing electrode and the second sensing electrode has a mesh structure comprising metal lines.

18. The input sensing unit according to claim 17,
   wherein sections of the first sensing line extend in a first direction,
   wherein sections the second sensing line extend in a second direction perpendicular to the first direction,
   wherein the sections of the first sensing line and the sections of the second sensing line extend parallel to the metal lines and extend obliquely relative to an edge of the input sensing unit, and
   wherein the input sensing unit further comprising:
   a third sensing line disposed in a first opening positioned in a first sensor among the first sensors; and
   a fourth sensing line disposed in a second opening positioned in a second sensor among the second sensors.

19. The input sensing unit according to claim 18, wherein each of the third sensing line and the fourth sensing line comprises at least two metal lines coupled to each other at one or more intersection points.

20. The input sensing unit according to claim 18, wherein each of the third sensing line and the fourth sensing line comprises a connection metal line and at least two metal lines indirectly coupled to each other through the connection metal line.

* * * * *